United States Patent
Wilhelmsson et al.

(10) Patent No.: US 11,051,249 B2
(45) Date of Patent: Jun. 29, 2021

(54) WAKE-UP SIGNAL TRANSMISSION

(71) Applicant: Telefonaktiebolaget LM Ericsson (publ), Stockholm (SE)

(72) Inventors: Leif Wilhelmsson, Lund (SE); Miguel Lopez, Solna (SE); Dennis Sundman, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/641,795

(22) PCT Filed: Aug. 23, 2018

(86) PCT No.: PCT/EP2018/072809
§ 371 (c)(1),
(2) Date: Feb. 25, 2020

(87) PCT Pub. No.: WO2019/048248
PCT Pub. Date: Mar. 14, 2019

(65) Prior Publication Data
US 2020/0267651 A1    Aug. 20, 2020

Related U.S. Application Data

(60) Provisional application No. 62/666,171, filed on May 3, 2018, provisional application No. 62/555,737, filed on Sep. 8, 2017.

(51) Int. Cl.
*H04W 52/02* (2009.01)
*H04L 1/00* (2006.01)
*H04W 56/00* (2009.01)

(52) U.S. Cl.
CPC ....... *H04W 52/0229* (2013.01); *H04L 1/0011* (2013.01); *H04L 1/0036* (2013.01); *H04W 56/001* (2013.01)

(58) Field of Classification Search
CPC .......... H04W 52/0229; H04W 56/0001; H04L 1/0011; H04L 1/0036
(Continued)

(56) References Cited

U.S. PATENT DOCUMENTS 6,643,275 B1  11/2003  Gustafsson et al.
2010/0150042 A1  6/2010  Oh et al.
(Continued)

FOREIGN PATENT DOCUMENTS

RU     2227372 C2      4/2004
WO     2012049064 A1   4/2012

OTHER PUBLICATIONS

Park, M. et al., "Low-Power Wake-Up Receiver (LP-WUR) for 802.11", IEEE 802.11 Working Group, Nov. 10, 2015, pp. 1-18, IEEE 802.11-15/1307r1, IEEE.
(Continued)

*Primary Examiner* — Jianye Wu
(74) *Attorney, Agent, or Firm* — Coats & Bennett, PLLC

(57) ABSTRACT

A method of a network node is disclosed. The method is for concurrently transmitting two or more wake-up signals (WUS) using an signal generator applying an signal generator symbol rate, wherein each WUS is for reception by a wake-up receiver (WUR) of a respective wireless communication device. The method comprises selecting a respective Manchester coding symbol rate for each of the two or more WUS, wherein all of the selected respective Manchester coding symbol rates are different from each other, and wherein all Manchester codes having the selected respective Manchester coding symbol rates are orthogonal to each other. The method also comprises generating each of the two or more WUS using the signal generator and application of a Manchester code of the selected respective Manchester coding symbol rate, and multiplexing the two or (Continued)

more WUS for transmission in a WUS message. Corresponding arrangement, network node and computer program product are also disclosed, as well as counterparts for a wireless communication device.

27 Claims, 7 Drawing Sheets

(58) Field of Classification Search
USPC .......................................................... 370/311
See application file for complete search history.

(56) References Cited

U.S. PATENT DOCUMENTS

| | | |
|---|---|---|
| 2012/0013565 A1 | 1/2012 | Westhues et al. |
| 2014/0119410 A1 | 5/2014 | Tian et al. |
| 2015/0208349 A1 | 7/2015 | Ramamurthy et al. |
| 2016/0337973 A1 | 11/2016 | Park et al. |
| 2020/0163018 A1* | 5/2020 | Wilhelmsson .... H04W 52/0245 |

OTHER PUBLICATIONS

Habuchi, H. et al., "A Code Division Multiplex Using Manchester-Coded Orthogonal Sequences", Electronics and Communications in Japan (Part I Communications), vol. 75 No. 7, Jul. 1, 1992, pp. 58-66, Wiley.

Kim, J. et al., "WUR MAC Issues", IEEE 802.11 Working Group, Jan. 15, 2017, pp. 1-15, IEEE 802.11-17/0054r2, IEEE.

Huawei et al., "On 'Wake-up Signal' for Paging and Connected-Mode DRX", 3GPP TSG RAN WG1 Meeting #89, Hangzhou, China, May 15, 2017, pp. 1-10, R1-1707021, 3GPP.

Intel Corporation, "Wake-Up Signal for efeMTC", 3GPP TSG RAN WG1 Meeting #90, Prague, Czech Republic, Aug. 21, 2017, pp. 1-8, R1-1712498, 3GPP.

* cited by examiner

WAKE-UP SIGNAL TRANSMISSION

TECHNICAL FIELD

The present disclosure relates generally to the field of wireless communication. More particularly, it relates to transmission of wake-up signals in wireless communication systems.

BACKGROUND

A wake-up receiver (WUR; sometimes referred to as a wake-up radio) provides for significant reduction of the power consumption in wireless communication receivers. One aspect of the WUR concept is that the WUR can be based on a very relaxed architecture, since it only needs to be able to detect presence of a wake-up signal (WUS) and may not be used for reception of data or other control signaling than the WUS.

Ongoing activities in the Institute of Electrical and Electronics Engineers (IEEE) 802.11 task group (TG) named IEEE 802.11ba aims at standardization of the physical (PHY) layer and the media access control (MAC) layer for a WUR that is to be used as a companion radio to the main IEEE 802.11 radio to significantly reduce the power consumption.

A possibility for generation of the WUS is using an inverse fast Fourier transform (IFFT), since such a functional block is already available in many transmitters, for example Wi-Fi transmitters supporting e.g. IEEE 802.11a/g/n/ac. One example approach to generation of the WUS using on-off keying (OOK) is to use 13 sub-carriers in the center of a frequency range of the IFFT, to populate them with a suitable signal to represent ON and to not transmit anything at all on these sub-carriers to represent OFF. In a typical example, the IFFT has 64 points and is operating at a sampling rate of 20 MHz. Just as for ordinary orthogonal frequency division multiplexing (OFDM), a cyclic prefix (CP) may be added after the IFFT operation in order to have the same duration and format as a normal OFDM symbol duration used in 802.11a/g/n/ac (and thus be able to spoof legacy stations by prepending a legacy preamble at the beginning of the WUS).

It may be desirable to concurrently transmit more than one WUS, e.g. when each WUS is intended for a single device and it is desirable to wake up several devices simultaneously. The desire to wake up more than on device at the same time may, for example, arise when the same frequency channel is used for both user data and WUS since, then, the transmission of a WUS reduces the transmission time available for user data.

It has been proposed in TG IEEE 802.11ba to transmit e.g. three WUS simultaneously by means of frequency division multiplexing (FDM). However, this approach enforces harder requirements on the WUR implementation in terms of accuracy of the frequency reference generation and in terms of filter complexity since one or more WUS intended for one or more other WUR needs to be attenuated.

Therefore, there is a need for alternative approaches to concurrent WUS transmission. Preferably, such approaches should not put harder requirements on the WUR implementation compared to non-concurrent WUS transmission. Also preferably, such approaches should be transparent for the WUR in terms of one or more WUS—not intended for the WUR but transmitted concurrently with a WUS intended for the WUR—not affecting the WUR operation.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a method of a network node, for concurrently transmitting two or more wake-up signals (WUS) using a signal generator applying a signal generator symbol rate, wherein each WUS is for reception by a wake-up receiver (WUR) of a respective wireless communication device.

The method comprises selecting a respective Manchester coding symbol rate for each of the two or more WUS, wherein all of the selected respective Manchester coding symbol rates are different from each other, and wherein all Manchester codes having the selected respective Manchester coding symbol rates are orthogonal to each other, generating each of the two or more WUS using the signal generator and application of a Manchester code of the selected respective Manchester coding symbol rate, and multiplexing the two or more WUS for transmission in a WUS message.

In some embodiments, selecting the respective Manchester coding symbol rates comprises letting any pair of the selected respective Manchester coding symbol rates differ by a factor of two to the power of n, where n is an integer.

In some embodiments, selecting the respective Manchester coding symbol rates comprises letting all of the selected respective Manchester coding symbol rates be related to the signal generator symbol rate by a factor of two to the power of k, where k is an integer.

In some embodiments, generating each of the two or more WUS comprises time aligning the two or more WUS with each other such that each of the two or more WUS has a Manchester coding symbol boundary whenever any WUS of a lower respective Manchester coding symbol rate has a Manchester coding symbol boundary.

In some embodiments, generating each of the two or more WUS comprises, when the selected respective Manchester coding symbol rate is lower than the signal generator symbol rate, applying the Manchester code to symbols of the WUS and inputting the result to the signal generator. When the selected respective Manchester coding symbol rate is equal to the signal generator symbol rate divided by two to the power of m, where m is a positive integer, the method may comprise repeating each of the Manchester coded symbols to produce two to the power of m identical Manchester coded symbols before inputting the result to the signal generator signal generator.

In some embodiments, generating each of the two or more WUS comprises applying the Manchester code in an on-off keying manner to an output from the OFDM signal generator based on symbols of the WUS.

In some embodiments, selecting the respective Manchester coding symbol rate for each of the two or more WUS comprises selecting a first Manchester coding symbol rate for a first WUS and selecting a second Manchester coding symbol rate for a second WUS, wherein the first Manchester coding symbol rate is lower than the second Manchester coding symbol rate when channel conditions associated with the respective wireless communication device of the first WUS require more robust transmission than channel conditions associated with the respective wireless communication device of the second WUS.

In some embodiments, generating each of the two or more WUS comprises applying a respective forward error correction code to at least one of the two or more WUS before application of the Manchester code.

In some embodiments, the method may further comprise selecting a coding rate of the respective forward error correcting code such that the selected coding rate of the respective forward error correcting code multiplied by the selected respective Manchester coding symbol rate enables use of a desirable WUS data rate.

In some embodiments, the method may further comprise generating a WUS packet for transmission, wherein the WUS packet comprises a first part for time synchronization by all of the respective wireless communication devices, and a second part comprising the multiplexed two or more WUS.

In some variants of the first aspect, this is achieved by a method of a network node, for concurrently transmitting two or more wake-up signals, WUS, using a signal generator applying a signal generator symbol rate, wherein each WUS is for reception by a wake-up receiver, WUR, of a respective wireless communication device.

In some embodiments, the method further comprises preparing a packet for concurrent transmission of the two or more WUS, wherein each WUS comprises a message and a prepended address field indicative of an intended receiver of the message, and wherein the WUS message comprises the packet. Then, preparing comprises organizing, as part of the multiplexing, the two or more WUS in time to at least partly overlap each other, wherein organizing the two or more WUS comprises staggering the address fields in time.

In some embodiments, the method further comprises prepending a common synchronization part to the multiplexed two or more WUS.

In some embodiments, the method further comprises transmitting the packet addressing the intended receivers.

In some embodiments, each of the two or more WUS are generated by application of on-off keying, OOK, or binary frequency shift keying, BFSK.

In some embodiments, the selected respective Manchester coding symbol rate is applied to the address field and the message.

In some embodiments, staggering the address fields in time comprises starting with the address field of the WUS generated by application of the lowest Manchester coding symbol rate among the selected respective Manchester coding symbol rates.

In some embodiments, staggering the address fields in time comprises staggering the address fields in time in an order corresponding to an increasing order of the selected respective Manchester coding symbol rates.

The method comprises selecting a respective Manchester coding symbol rate for at least one of the two or more WUS, wherein all of the selected respective Manchester coding symbol rates are different from each other, and wherein all Manchester codes having the selected respective Manchester coding symbol rates are orthogonal to each other. One or more WUS are generated using the signal generator and application of a Manchester code of the selected respective Manchester coding symbol rate, and a non-Manchester coded WUS is generated using on-off keying and the signal generator. The at least one Manchester-coded WUS is multiplexed with the non-Manchester coded WUS for transmission in a WUS message.

In some variants of the first aspect, the two or more WUS consist of a first WUS and a second WUS. In these variants, the method comprises selecting a Manchester coding symbol rate for the first WUS and generating the first WUS using the OFDM signal generator and application of a Manchester code of the selected Manchester coding symbol rate. In these variants, the method further comprises generating the second WUS as a non-Manchester coded WUS using on-off keying and the OFDM signal generator and multiplexing the first and second WUS for transmission in a WUS message.

In some embodiments, each WUS is for waking up a main receiver of the respective wireless communication device responsive to detection of the WUS by the WUR.

A second aspect is a method of a wake-up receiver (WUR) configured to be comprised in a wireless communication device also comprising a main receiver. The wireless communication device is configured to receive, from the network node, a wake-up signal (WUS) message comprising two or more multiplexed WUS, one of which, a particular WUS, being for waking up the main receiver of the wireless communication device. Each of the two or more WUS is encoded by a Manchester code of a selected respective Manchester coding symbol rate, wherein all of the selected respective Manchester coding symbol rates are different from each other, and wherein all Manchester codes having the selected respective Manchester coding symbol rates are orthogonal to each other.

The method comprises receiving the WUS message, determining which of the selected respective Manchester coding symbol rates to apply, demodulating the WUS message using the determined Manchester coding symbol rate, determining whether the particular WUS is detected, and waking up the main receiver responsive to detection of the particular WUS.

It should be noted that, in some embodiments, determining which of the selected respective Manchester coding symbol rates to apply is performed before receiving the WUS message. Typically, the determination of Manchester coding symbol may be based on a negotiation (with the network node) performed by the main receiver during a period when it is awake.

In some embodiments, the particular WUS is encoded by a respective forward error correction code before application of the Manchester code. Then, the method may further comprise determining one or more parameters of the respective forward error correction code and forward error correction decoding the WUS message based on the determined parameters after demodulating the WUS message.

In some embodiments, the WUS message is comprised in a WUS packet, wherein the WUS packet comprises a first part for time synchronization by the wireless communication device, and a second part comprising the WUS message.

In some embodiments, the method further comprises processing of a received packet comprising the two or more multiplexed WUS concurrently transmitted, wherein each WUS comprises a message and a prepended address field indicative of an intended receiver of the message, wherein the two or more WUS at least partly overlap each other in time, wherein the address fields are staggered in time, and wherein the WUS message comprises the packet. Then, determining which of the selected respective Manchester coding symbol rates to apply comprises determining, for a first address field of the address fields, whether the intended receiver of the first address field is the WUR. In these embodiments, demodulating the WUS message comprises, when the intended receiver of the first address field is the WUR, demodulating a first WUS of the two or more WUS comprising the first address field.

In some embodiments, determining which of the selected respective Manchester coding symbol rates to apply further comprises, when the intended receiver of the first address field is not the WUR, determining, for a second address field of the address fields, whether the intended receiver of the second address field is the WUR. In these embodiments, demodulating the WUS message comprises, when the intended receiver of the second address field is the WUR, demodulating a second WUS of the two or more WUS comprising the second address field.

In some embodiments, the address fields are staggered in time starting with the address field of the WUS having lowest Manchester coding symbol rate among the respective Manchester coding symbol rates. Then, the method may further comprise identifying a Manchester coding symbol rate of the second WUS as a Manchester coding symbol rate which is higher than a Manchester coding symbol rate of the first WUS, and using the identified Manchester coding symbol rate of the second WUS for determining whether the intended receiver of the second address field is the WUR.

In some embodiments, the received packet further comprises a common synchronization part prepended to the multiplexed two or more WUS, and the method may further comprise identifying the Manchester coding symbol rate of the first WUS from the common synchronization part, and using the identified Manchester coding symbol rate of the first WUS for determining whether the intended receiver of the first address field is the WUR.

A third aspect is a computer program product comprising a non-transitory computer readable medium, having thereon a computer program comprising program instructions. The computer program is loadable into a data processing unit and configured to cause execution of the method according to any of the first aspect and the second aspect when the computer program is run by the data processing unit.

A fourth aspect is an arrangement for a network node, for concurrent transmission of two or more wake-up signals (WUS) using a signal generator configured to apply a signal generator symbol rate, wherein each WUS is for reception by a wake-up receiver (WUR) of a respective wireless communication device.

The arrangement comprises a controller configured to cause selection of a respective Manchester coding symbol rate for each of the two or more WUS, wherein all of the selected respective Manchester coding symbol rates are different from each other, and wherein all Manchester codes having the selected respective Manchester coding symbol rates are orthogonal to each other. The controller is also configured to cause generation of each of the two or more WUS using the signal generator and application of a Manchester code of the selected respective Manchester coding symbol rate, and multiplexing of the two or more WUS for transmission in a WUS message.

A variant of the fourth aspect is an arrangement for a network node, for concurrent transmission of two or more wake-up signals, WUS, using a signal generator configured to apply a signal generator symbol rate, wherein each WUS is for reception by a wake-up receiver, WUR, of a respective wireless communication device.

The arrangement comprises a controller configured to cause selection of a respective Manchester coding symbol rate for at least one of the two or more WUS, wherein all of the selected respective Manchester coding symbol rates are different from each other, and wherein all Manchester codes having the selected respective Manchester coding symbol rates are orthogonal to each other. The controller is also configured to cause generation of one or more WUS using the signal generator and application of a Manchester code of the selected respective Manchester coding symbol rate; generation of a non-Manchester coded WUS using on-off keying and the signal generator; and multiplexing of the at least one Manchester-coded WUS with the non-Manchester coded WUS for transmission in a WUS message.

A fifth aspect is a network node comprising the arrangement of the fourth aspect.

A sixth aspect is an arrangement for a wake-up receiver (WUR) configured to be comprised in a wireless communication device also comprising a main receiver, the wireless communication device configured to receive, from the network node, a wake-up signal (WUS) message comprising two or more multiplexed WUS, one of which, a particular WUS, being for waking up the main receiver of the wireless communication device. Each of the two or more WUS is encoded by a Manchester code of a selected respective Manchester coding symbol rate, wherein all of the selected respective Manchester coding symbol rates are different from each other, and wherein all Manchester codes having the selected respective Manchester coding symbol rates are orthogonal to each other.

The arrangement comprises a controller configured to cause reception of the WUS message, determination of which of the selected respective Manchester coding symbol rates to apply, demodulation of the WUS message using the determined Manchester coding symbol rate, determination of whether the particular WUS is detected, and waking up of the main receiver responsive to detection of the particular WUS.

A seventh aspect is a wireless communication device comprising the arrangement of the sixth aspect.

According to an eighth aspect, this is achieved by a method of a wireless transmitter, for preparing a packet for concurrent transmission of two or more signals, wherein each signal comprises a message and a prepended address field indicative of an intended receiver of the message.

The method comprises multiplexing the two or more signals for transmission in the packet by organizing the two or more signals in time to at least partly overlap each other, wherein organizing the two or more signals comprises staggering the address fields in time.

Generally, overlap and/or staggering may be in time (e.g. in a time domain) according to typical embodiments.

In some embodiments, the method further comprises prepending a common synchronization part to the multiplexed two or more signals.

In some embodiments, the method further comprises transmitting the packet addressing the intended receivers.

In some embodiments, each of the two or more signals are generated by application of on-off keying, OOK, or binary frequency shift keying, BFSK.

In some embodiments, the two or more signals are two or more wake-up signals, WUS.

In some embodiments, the method further comprises selecting a respective symbol rate for generation of each of the two or more signals, wherein all of the selected respective symbol rates are different from each other, and generating each of the two or more signals by application of the selected respective symbol rate to the address field and the message.

In some embodiments, staggering the address fields in time comprises starting with the address field of the signal generated by application of the lowest symbol rate among the selected respective symbol rates.

In some embodiments, staggering the address fields in time comprises staggering the address fields in time in an order corresponding to an increasing order of the selected respective symbol rates.

In some embodiments, selecting the respective symbol rates comprises letting any pair of the selected respective symbol rates differ by a factor of two to the power of n, where n is an integer.

In some embodiments, the respective symbol rates are respective Manchester coding symbol rates.

In some embodiments, all Manchester codes having the selected respective Manchester coding symbol rates are orthogonal to each other.

A ninth aspect is a method of a wireless receiver, for processing of a received packet comprising two or more multiplexed signals concurrently transmitted, wherein each signal comprises a message and a prepended address field indicative of an intended receiver of the message, wherein the two or more signals at least partly overlap each other in time, and wherein the address fields are staggered in time.

The method comprises determining, for a first address field of the address fields, whether the intended receiver of the first address field is the wireless receiver, and when the intended receiver of the first address field is the wireless receiver, demodulating a first signal of the two or more signals comprising the first address field.

In some embodiments, the method further comprises, when the intended receiver of the first address field is not the wireless receiver, determining, for a second address field of the address fields, whether the intended receiver of the second address field is the wireless receiver, and when the intended receiver of the second address field is the wireless receiver, demodulating a second signal of the two or more signals comprising the second address field.

In some embodiments, wherein respective symbol rates of the two or more signals are different from each other, and wherein the address fields are staggered in time starting with the address field of the signal having lowest symbol rate among the respective symbol rates, the method further comprises identifying a symbol rate of the second signal as a symbol rate which is higher than a symbol rate of the first signal, and using the identified symbol rate of the second signal for determining whether the intended receiver of the second address field is the wireless receiver.

In some embodiments, wherein the received packet further comprises a common synchronization part prepended to the multiplexed two or more signals, the method further comprises identifying the symbol rate of the first signal from the common synchronization part, and using the identified symbol rate of the first signal for determining whether the intended receiver of the first address field is the wireless receiver.

In some embodiments, the two or more signals are two or more wake-up signals, WUS, and wherein the wireless receiver is a wake-up radio, WUR.

A tenth aspect is a computer program product comprising a non-transitory computer readable medium, having thereon a computer program comprising program instructions. The computer program is loadable into a data processing unit and configured to cause execution of the method according to the eighth or ninth aspect when the computer program is run by the data processing unit.

A eleventh aspect is an apparatus for a wireless transmitter, for preparing a packet for concurrent transmission of two or more signals, wherein each signal comprises a message and a prepended address field indicative of an intended receiver of the message.

The apparatus comprises a controller configured to cause multiplexing of the two or more signals for transmission in the packet by causing organizing of the two or more signals in time to at least partly overlap each other, wherein organizing of the two or more signals comprises staggering of the address fields in time.

A twelfth aspect is a wireless transmitter node comprising the apparatus of the eleventh aspect.

A thirteenth aspect is an apparatus for a wireless receiver, for processing of a received packet comprising two or more multiplexed signals concurrently transmitted, wherein each signal comprises a message and a prepended address field indicative of an intended receiver of the message, wherein the two or more signals at least partly overlap each other in time, and wherein the address fields are staggered in time.

The apparatus comprises a controller configured to cause determination, for a first address field of the address fields, of whether the intended receiver of the first address field is the wireless receiver, and responsive to the intended receiver of the first address field being the wireless receiver, demodulation of a first signal of the two or more signals comprising the first address field.

A fourteenth aspect is a wireless receiver comprising the apparatus of the thirteenth aspect.

In some embodiments, any of the above aspects may additionally have features identical with or corresponding to any of the various features as explained above for any of the other aspects.

An advantage of some embodiments is that concurrent WUS transmission is enabled. An advantage with concurrent WUS transmission is that the capacity of the wireless communication system is used efficiently.

Another advantage of some embodiments is that the concurrent WUS transmission is transparent for the WUR.

Yet an advantage of some embodiments is that WUR implementation may be less complicated (more relaxed requirements) compared to when other concurrent WUS transmission approaches are applied.

According to some embodiments, a simple and flexible way to multiplex signals is provided wherein Manchester coding is used. The multiplexing is transparent for the receiver according to some embodiments. Therefore, the approach can be introduced in already existing standards. Alternatively or additionally, the approach may be introduced as a proprietary feature.

Another advantage of some embodiments is that the WUS link performance for a user depends on the transmit power allocated to the user, but is independent of the number of WUS that are being multiplexed. Thus, if the transmit power allocated to a user is kept constant, the link performance for that user is not degraded when two or more WUS are multiplexed compared to if the WUS of the user was transmitted singly.

An advantage of some embodiments is that an approach to addressing respective receivers is provided; that is suitable for concurrent transmission, in a single packet, of two or more different signals intended for the respective receivers.

A further advantage is that the approach is particularly suitable when the two or more different signals have different symbol rates.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
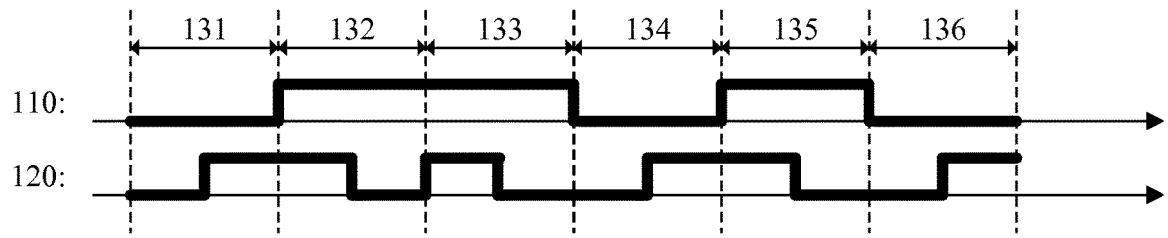
FIG. 1 is a schematic timing diagram illustrating Manchester coding.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, it should be noted that the notation "in time" used to herein may be interpreted as "in a/the time domain". For example, organizing two or more signals in time to at least partly overlap each other, may be interpreted as organizing the two or more signals in a time domain to at least partly overlap each other. Similarly, staggering the address fields in time may be interpreted as staggering the address fields in a time domain.

This disclosure concerns wake-up signal transmission and packet structure for concurrent transmission. The present disclosure relates generally to the field of wireless communication. More particularly, it relates to transmission of wake-up signals in wireless communication systems and to concurrent transmission of two or more signals in a packet.

Generally, it should be noted that even though background art, problems, and embodiments are described herein in the context of wake-up signals, some embodiments are equally applicable to scenarios with concurrent transmission and reception of signals other than wake-up signals. Thus, the context of wake-up signals used herein should not be construed as limiting but merely illustrative.

In this description, the notation "WUS" is used to for both the singular from (i.e. one/the WUS) and the plural form (i.e. several/the WUS), and the context defines whether the singular form, the plural form, or both is intended.

The term "WUS data rate" will be used to denote—for a WUS—the number of information symbols (typically data bits) per time unit, and the term "WUS symbol rate" will be used to denote—for a WUS—the number of symbols (typically data bits) to be transmitted per time unit. The WUS symbol rate matches the Manchester coding symbol rate. When no FEC is applied the WUS data rate is equal to the WUS symbol rate, and when FEC is applied the WUS data rate is used to denote the symbol rate before FEC coding and the WUS symbol rate is used to denote the symbol rate after FEC coding.

As mentioned above, there is a need for alternative approaches to concurrent WUS transmission.

Concurrent WUS transmission may be achieved by a method (and/or a corresponding arrangement) of a network node, for concurrently transmitting two or more wake-up signals (WUS) using a signal generator applying a signal generator symbol rate, wherein each WUS is for reception by a wake-up receiver (WUR) of a respective wireless communication device.

The method comprises selecting a respective Manchester coding symbol rate for each of the two or more WUS, wherein all of the selected respective Manchester coding symbol rates are different from each other, and wherein all Manchester codes having the selected respective Manchester coding symbol rates are orthogonal to each other, generating each of the two or more WUS using the signal generator and application of a Manchester code of the selected respective Manchester coding symbol rate, and multiplexing the two or more WUS for transmission in a WUS message.

In some embodiments, each WUS is for waking up a main receiver of the respective wireless communication device responsive to detection of the WUS by the WUR.

Reception of concurrently transmitted WUS may be achieved by a method (and/or a corresponding arrangement) of a wake-up receiver (WUR) configured to be comprised in a wireless communication device also comprising a main receiver. The wireless communication device is configured to receive, from the network node, a wake-up signal (WUS) message comprising two or more multiplexed WUS, one of which, a particular WUS, being for waking up the main receiver of the wireless communication device. Each of the two or more WUS is encoded by a Manchester code of a selected respective Manchester coding symbol rate, wherein all of the selected respective Manchester coding symbol rates are different from each other, and wherein all Manchester codes having the selected respective Manchester coding symbol rates are orthogonal to each other.

The method comprises receiving the WUS message, determining which of the selected respective Manchester coding symbol rates to apply, demodulating the WUS message using the determined Manchester coding symbol rate, determining whether the particular WUS is detected, and waking up the main receiver responsive to detection of the particular WUS.

It should be noted that, in some embodiments, determining which of the selected respective Manchester coding symbol rates to apply is performed before receiving the WUS message. Typically, the determination of Manchester coding symbol may be based on a negotiation (with the network node) performed by the main receiver during a period when it is awake.

A challenge faced when two or more signals (two or more "sub-packets") with different symbol rates are multiplexed in a single packet for concurrent transmission is how to send corresponding control information (indicating, e.g., one or more of: an intended receiver of the signal, a packet type, a packet length, a signal length within the packet—i.e. a sub-packet length, etc.). This may be especially challenging when the sub-packets, for example, are of different types and/or have different lengths. Solutions to this challenge will be provided later herein.

Furthermore, since the total energy (or power) of the packet is shared between the different signals, it may be advantageous to use the same synchronization sequence for all signals to avoid degradation of the synchronization performance. It will also be provided later herein embodiments where use of the same synchronization sequence for all signals in a packet is enabled.

The context of concurrent transmission of two or more WUS will now be further elaborated on.

In the following, the context where each WUS is for waking up a main receiver of the respective wireless communication device responsive to detection of the WUS by the WUR will be illustratively used. However, it should be noted that, alternatively or additionally, the WUS may be used for other purposes than waking up a main receiver (e.g. to carry small pieces of data) and that embodiments presented herein may be equally applicable in such situations.

A commonly used modulation for the WUS (i.e., the signal sent to the WUR) is on-off keying (OOK). OOK is a binary modulation, where a logical one is represented by signal presence, i.e. by sending a signal (ON), and a logical zero is represented by signal absence, i.e. by not sending any signal (OFF); or vice versa. In order to decode an OOK-modulated signal, the receiver needs to estimate which signal level corresponds to the presence of a signal and which signal level corresponds to the absence of a signal, which typically involves determining an OOK threshold value.

Another modulation that may be used for WUS is binary frequency shift keying (BFSK). BFSK is a modulation where a logical one is represented by a positive frequency deviation from the carrier frequency, whereas a logical zero is represented by a negative frequency deviation; or vice versa. Thus, a BFSK receiver needs to determine whether a received signal was sent with positive or negative frequency deviation, which—in analogy with the OOK threshold value—typically involves estimating the carrier frequency with some accuracy.

Manchester coding is a modulation approach which may generally be applied to simplify clock recovery and/or demodulation at a receiver. These simplifications may be achieved since the average signal level of a Manchester coded signal carries no information, which is also true for each Manchester coded symbol.

FIG. 1 schematically illustrates the principles of Manchester coding in a timing diagram where 110 denotes the binary information symbols to be encoded (low value for "0" and high value for "1") and 120 denotes the Manchester coded symbols resulting from the binary symbols 110. In FIG. 1, the Manchester coding symbol rate is defined via the length of each Manchester coded symbol 131, 132, 133, 134, 135, 136.

According to the Manchester coding scheme illustrated in FIG. 1, a binary symbol representing a logical one ("1") is encoded to a logical one for the first half of the corresponding Manchester coded symbol and to a logical zero for the second half of the corresponding Manchester coded symbol, see time intervals 132, 133 and 135. In contrast, a binary symbol representing a logical zero ("0") is encoded to a logical zero for the first half of the corresponding Manchester coded symbol and to a logical one for the second half of the corresponding Manchester coded symbol, see time intervals 131, 134 and 136. The Manchester encoded symbols 120 may then be modulated using e.g. OOK or BFSK.

It should be noted that the opposite mapping compared to FIG. 1 is another way of applying Manchester coding; encoding a logical one to logical zero in the first half and logical one in the second half and encoding a logical zero to logical one in the first half and logical zero in the second half.

Clock recovery is simplified by use of Manchester coding because there will always be a transition from zero to one, or vice versa, in the middle of each Manchester coded symbol irrespective of what value the information symbol has.

Demodulation may be simplified by use of Manchester coding because the average value of each Manchester coded symbol irrespective of what value the information symbol has. Hence, there is no need for estimation of threshold value in the case of OOK or carrier frequency in the case of BFSK as will be elaborated on in the following.

Decoding of a Manchester coded symbol may typically be done by comparing the signal value during the first and second halves of the symbol, and—if the mapping of FIG. 1 is applied for OOK—deciding in favor of a logical one if the signal value during the first half of the symbol is larger than the signal value during the second half of the symbol. This may be implemented via determination of a metric value, $x = r_0 - r_1$, where $r_0$ and $r_1$ represent the signal values during the first and second half of the symbol, respectively. Then, an estimate, $\hat{d}$, of the information symbol may be obtained as $\hat{d}=1$ if $x \geq 0$ and $\hat{d}=0$ if $x<0$. When Manchester coding is applied in the context of BFSK, decoding may typically done by comparing the frequency during the first half of a symbol and the frequency during the second half of the symbol.

Since the metric, x, is generated by subtracting the signal value during the second half of the symbol from the signal value during the first half of the symbol, the average signal value will not affect the metric used for making the decision. Due to this property of the Manchester coding, it is an attractive approach to avoid the need for estimating a decision threshold for discriminating between a logical one and a logical zero. Two examples of when such a threshold estimation is not straight-forward are OOK and BFSK.

Manchester coded BFSK is used in the long range mode (BLR) of Bluetooth Low Energy (BLE). Manchester coded OOK is being standardized within the IEEE 802.11ba task group (TG). TG 802.11ba develops a standard for WUR wherein an aim is to significantly reduce the power consumption in devices based on the 802.11 standard. It is proposed to generate the WUS by using an IFFT since this functional block is already available in Wi-Fi transmitters supporting e.g. 802.11a/g/n/ac. Specifically, an approach discussed for generating the WUS is to use the 13 central sub-carriers and populating them with some suitable signal to represent "ON" and to defer from transmission to represent "OFF".

In the following, embodiments will be described for a network node (e.g. an access point—AP) for concurrently transmitting two or more WUS using a signal generator applying a signal generator symbol rate. Typically the signal generator is an OFDM signal generator (e.g. implemented using an inverse fast Fourier transform—IFFT) applying an OFDM symbol rate. Another alternative is a Binary Frequency Shift Keying, BFSK, signal generator. In the following description, embodiments with a OFDM signal generator are described as non-limiting examples.

Each WUS is for waking up a main receiver of a respective wireless communication device (WCD; e.g. a station—STA—or a user equipment—UE) responsive to detection of the WUS by a WUR of the WCD. Embodiments will also be described for reception of the one of the WUS at the WCD.

Figure 2:
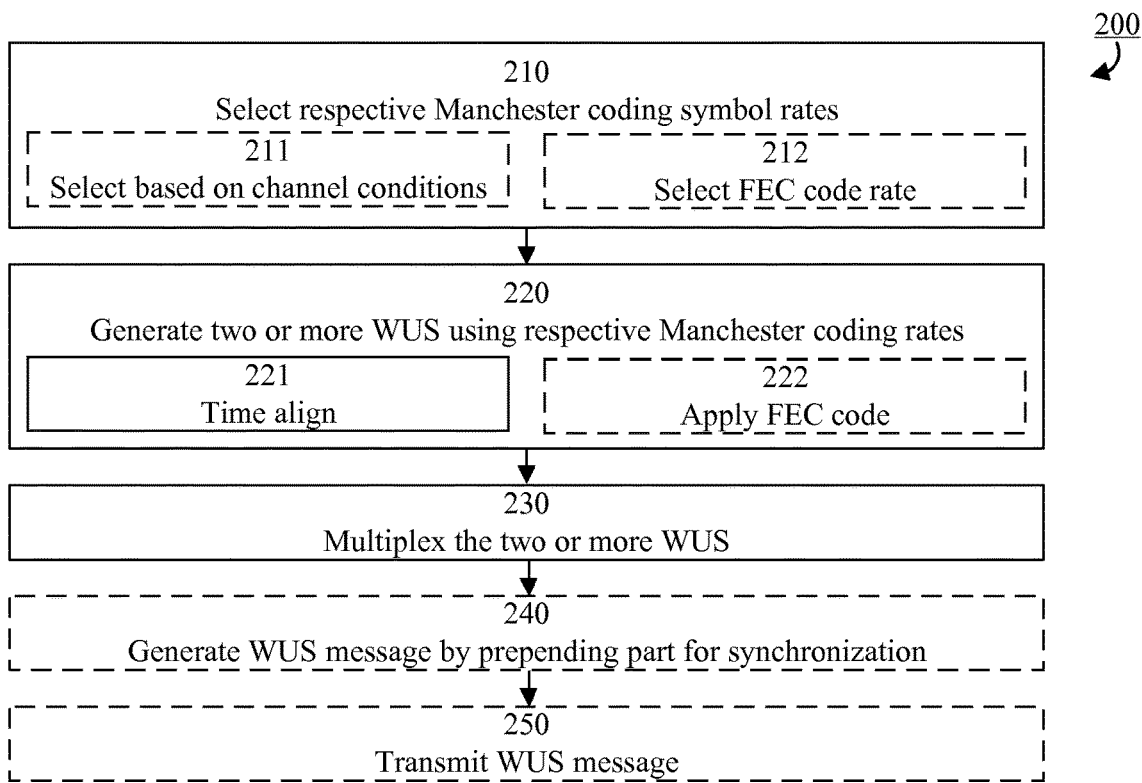
FIG. 2 is a flowchart illustrating example method steps according to some embodiments.

FIG. 2 illustrates an example method 200 for a network node according to some embodiments. In analogy with the context described above, the method is for concurrently transmitting two or more WUS using an OFDM signal generator applying an OFDM symbol rate, wherein each WUS is for waking up a main receiver of a respective WCD responsive to detection of the WUS by a WUR of the WCD.

In step 210, a respective Manchester coding symbol rate is selected for each of the two or more WUS. All of the selected respective Manchester coding symbol rates are different from each other and all Manchester codes having the selected respective Manchester coding symbol rates are orthogonal to each other.

Orthogonality may be defined herein in terms of the property elaborated on above; that the WUS information symbol value corresponding to any symbol of any of the Manchester codes can be estimated without being affected by any of the other WUS.

In some embodiments, this property may be achieved by selecting the respective Manchester coding symbol rates in a particular way and time aligning the generated WUS before multiplexing as will be illustrated later on in connection with FIG. 3.

As illustrated by optional sub-step 211, the selection of Manchester coding symbol rates may comprise selecting the Manchester coding symbol rates based on channel conditions between the network node and the WCD targeted by the respective WUS. Typically, a low Manchester coding symbol rate may be applied when a WCD requires robust transmission due to bad channel conditions and a high Manchester coding symbol rate may be applied when a WCD experiences good channel conditions.

Channel conditions may be measured in terms of any suitable metric, for example, signal-to-noise ratio (SNR), signal-to-interference ratio (SIR), signal-to-noise-and-interference ratio (SNIR), received signal strength indicator (RSSI), or received symbol code power (RSCP). The appropriate level of robustness may be achieved via selection any suitable parameter (or combination of parameters), for example, information symbol rate, Manchester coding symbol rate, and code rate of a forward error correcting code.

In step 220, each of the two or more WUS are generated using the OFDM signal generator and application of a Manchester code of the selected respective Manchester coding symbol rate. As mentioned above, the generation may typically comprise time aligning the WUS with each other as illustrated by sub-step 221.

As mentioned above, a forward error correcting (FEC) code may be applied in combination with the Manchester coding in some embodiments. This is illustrated in FIG. 2 via optional sub-step 212 where a FEC code rate is selected and via optional sub-step 222 where the FEC code is applied. FEC coding may be applied to none, one, some or all of the two or more WUS as applicable.

The FEC code rate may be selected in combination with the Manchester coding symbol rate to result in a desirable overall symbol rate. Thus, sub-step 212 may comprise selecting a coding rate of the respective FEC code such that the selected coding rate of the respective FEC code multiplied by the selected respective Manchester coding symbol rate enables use of a desirable WUS data rate.

For example, the FEC code rate and the Manchester coding symbol rate may be selected to fulfill a robustness condition stipulated due to channel conditions as elaborated on above. Alternatively or additionally, the FEC code rate and the Manchester coding symbol rate may be selected such that some or all of the WUS have equal WUS data rate (even if their respective Manchester coding symbol rates are different). Thus, sub-step 212 may comprise selecting a coding rate of the respective FEC code such that the selected coding rate of the respective FEC code multiplied by the selected respective Manchester coding symbol rate is equal for at least two of the two or more WUS.

In step 230, the two or more WUS are multiplexed for transmission in a WUS message. In optional step 240, the WUS message (or WUS packet) is generated by prepending a part for synchronization and, in optional step 250, the WUS message is transmitted.

Figure 2A:
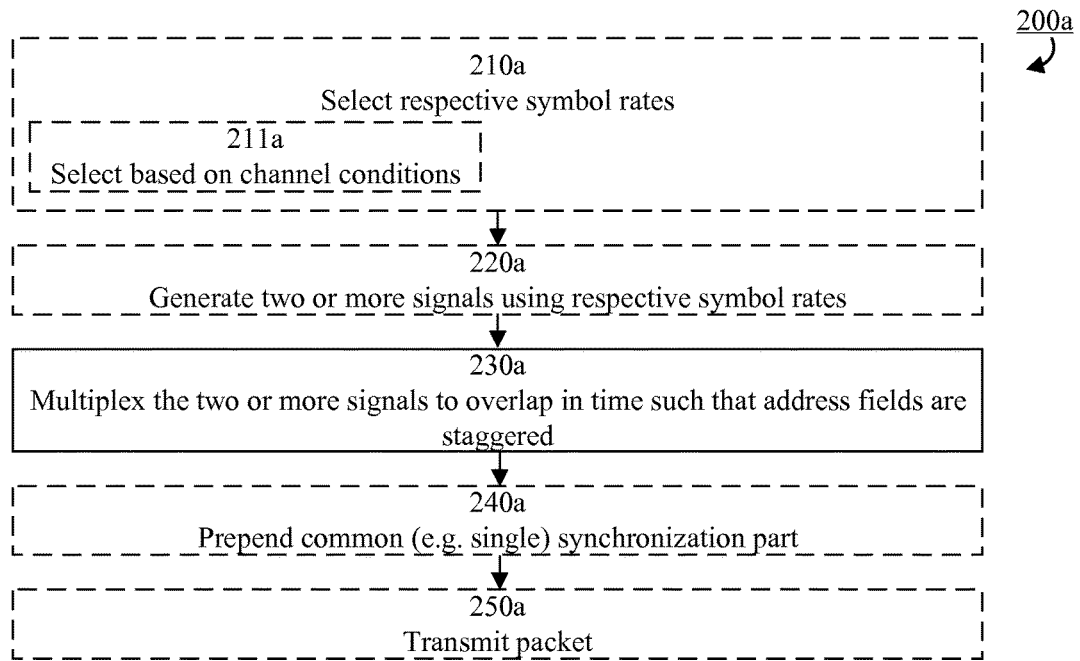
FIG. 2a is a flowchart illustrating example method steps according to some embodiments.

FIG. 2a illustrates an example method 200a for a wireless transmitter (e.g., a network node) according to some embodiments. The method 200a may be considered as an alternative to the method 200. In some embodiments, one or more steps of the method 200a may be merged with corresponding one or more steps of the method 200 to provide other alternative methods. Furthermore, in some embodiments, one or more steps of the method 200a may be combined with one or more steps of the method 200 to provide yet other alternative methods.

The method 200a is for preparing a packet (e.g., a WUS message) for concurrent transmission of two or more signals (e.g., two or more WUS), wherein each signal comprises a message (the data, or payload, for an intended user/receiver; not to be confused with the WUS message). Typically, but not necessarily, the respective intended receivers (e.g. respective WUR) of the two or more signals are different receivers.

Each signal also comprises a prepended address field indicative of the intended receiver of the message.

In optional step 210a, a respective symbol rate is selected for generation of each of the two or more signals. All of the selected respective symbol rates are typically different from each other (e.g., to achieve the advantages described above in the context of concurrent WUS transmission). Step 210a may, for example, be implemented as described above in connection with step 210 of FIG. 2 and/or otherwise described herein.

For example, selecting the respective symbol rates may comprise letting any pair of the selected respective symbol rates differ by a factor of two to the power of n, where n is an integer as described above. The respective symbol rates may be respective Manchester coding symbol rates, wherein all Manchester codes having the selected respective Manchester coding symbol rates are orthogonal to each other.

As illustrated by optional sub-step 211*a*, the selection of symbol rates may comprise selecting symbol rates based on channel conditions between the wireless transmitter and the intended receiver targeted by the respective signal. Step 211*a* may, for example, be implemented as described above in connection with step 211 of FIG. 2 and/or otherwise described herein.

In optional step 220*a*, each of the two or more signals is generated by application of the selected respective symbol rate to the address field and the message. Step 220*a* may, for example, be implemented as described above in connection with step 220 of FIG. 2 and/or otherwise described herein.

In step 230*a*, the two or more signals are multiplexed for transmission in the packet. The multiplexing is achieved by organizing the two or more signals in time to at least partly overlap each other, while staggering the address fields in time. Additionally, step 230*a* may, for example, be implemented as described above in connection with step 230 of FIG. 2 and/or otherwise described herein.

Staggering the address fields in time may typically comprise starting with the address field of the signal generated by application of the lowest symbol rate among the selected respective symbol rates and staggering the address fields in time in an order corresponding to an increasing order of the selected respective symbol rates.

In optional step 240*a*, a common synchronization part is prepended to the multiplexed two or more signals. Generally, the common synchronization part is for synchronization by at least two (typically all) of the two or more intended receivers. The common synchronization part may be a single synchronization part according to some embodiments, e.g., a single synchronization sequence.

The packet addressing the intended receivers is transmitted in optional step 250*a*.

Returning to the WUS context example, orthogonality between the different WUS may be achieved by selecting the respective Manchester coding symbol rates such that any pair of the selected respective Manchester coding symbol rates differ by a factor of two to the power of n, where n is an integer, and time aligning the generated WUS before multiplexing such that each WUS has a Manchester coding symbol boundary whenever any WUS of a lower respective Manchester coding symbol rate has a Manchester coding symbol boundary.

The context described herein entails that n is an integer not equal to zero since all of the selected respective Manchester coding symbol rates are different from each other. Furthermore, depending on how you compare the two Manchester coding symbol rates of a pair (i.e. which one is the nominator and denominator, respectively, in the expression of the factor) the integer n may be either positive or negative.

To enable WUS generation using the OFDM signal generator, the selection of the respective Manchester coding symbol rates typically also comprises letting all of the selected respective Manchester coding symbol rates be related to the OFDM symbol rate by a factor of two to the power of k, where k is an integer. Time alignment is typically also done such that, for each WUS, either each OFDM symbol boundary coincides with a Manchester coding symbol boundary of the WUS, or each Manchester coding symbol boundary of the WUS coincides with a OFDM symbol boundary.

It can be noted that in principle no relation between the Manchester coding symbol rate and the OFDM symbol rate is required. In the case when the Manchester coding symbol rate is less than the OFDM symbol rate, it may be convenient to have an integer value relation between the rates. For example: User 1 can use Manchester coding symbol rate=1/6 of the OFDM symbol rate. User 2 can use Manchester coding symbol rate=1/12 of the OFDM symbol rate.

Depending on how the Manchester coding symbol rate is compared to the OFDM symbol rate (i.e. which one is the nominator and denominator, respectively, in the expression of the factor), and depending on whether the Manchester coding symbol rate is higher or lower than the OFDM symbol rate, the integer k may be either positive or negative.

Figure 3:
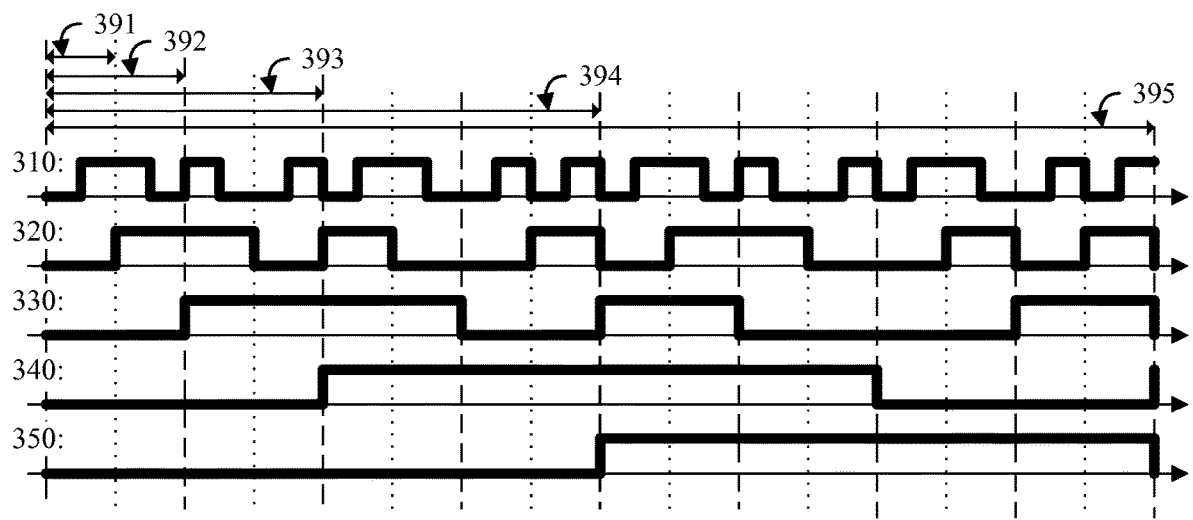
FIG. 3 is a schematic timing diagram illustrating different WUS according to some embodiments.

FIG. 3, where an OFDM symbol extends in the time interval 393, is a schematic timing diagram illustrating different WUS, 310, 320, 330, 340, 350, that fulfill the requirements of the two paragraphs above.

The WUS 310 has a Manchester coding symbol rate that is four times the OFDM symbol rate (the OFDM symbol length 393 is four times the Manchester coding symbol length 391), i.e. k=2. The WUS 320 has a Manchester coding symbol rate that is two times the OFDM symbol rate (the OFDM symbol length 393 is two times the Manchester coding symbol length 392), i.e. k=1. The WUS 330 has a Manchester coding symbol rate that is the same as the OFDM symbol rate (the OFDM symbol length 393 equals the Manchester coding symbol length 393), i.e. k=0. The WUS 340 has a Manchester coding symbol rate that is half the OFDM symbol rate (the OFDM symbol length 393 is half the Manchester coding symbol length 394), i.e. k=−1. The WUS 350 has a Manchester coding symbol rate that is one fourth of the OFDM symbol rate (the OFDM symbol length 393 is one fourth of the Manchester coding symbol length 395), i.e. k=−2.

It is easily realized that the Manchester coding symbol rates of each pair of the WUS 310, 320, 330, 340, 350 differ (are related) by a factor of two to the power of n, where n is an integer. For example, the Manchester coding symbol rates the pair of WUS 320 and 350 are related by a factor of eight (the Manchester coding symbol length 395 is eight times the Manchester coding symbol length 392), i.e. n=3 (or n=−3 depending on how the pair is ordered).

It is also easily seen that the WUS symbol boundaries and the OFDM symbol boundaries are aligned in time as specified above. All of these properties together results in orthogonality and enables WUS generation using the OFDM signal generator.

Figure 4:
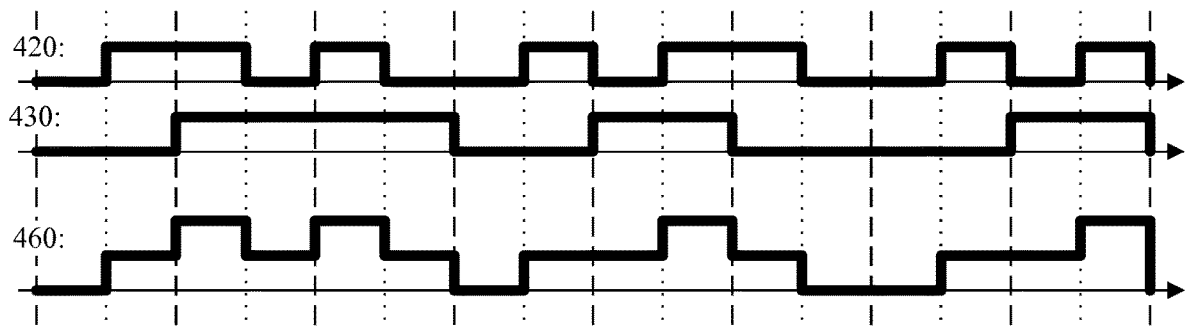
FIGS. 4 and 5 are schematic timing diagrams illustrating multiplexing of different WUS according to some embodiments.
Figure 5:
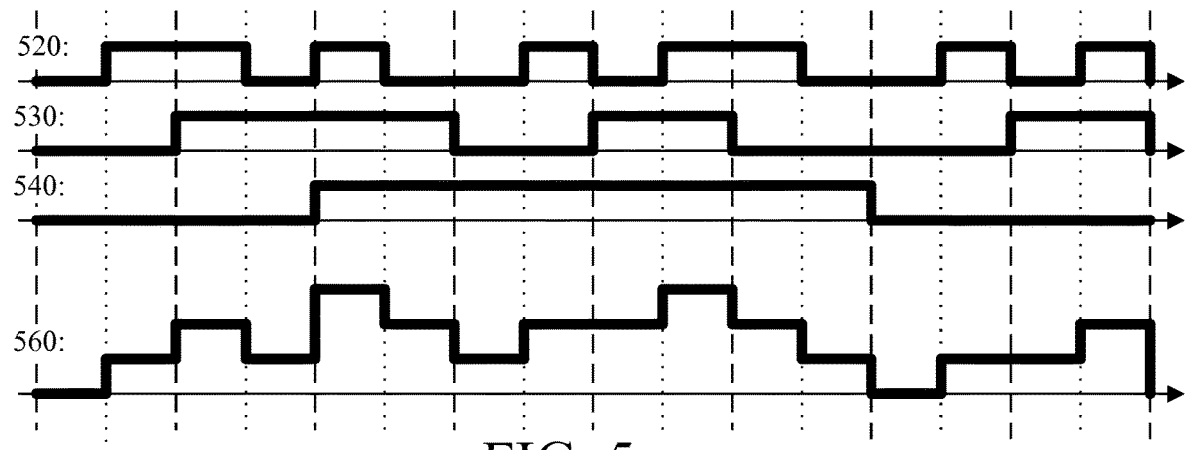

FIGS. 4 and 5 schematically illustrate multiplexing of different WUS according to some embodiments. In FIG. 4, two WUS 420 and 430 (compare with 320 and 330 of FIG. 3) are multiplexed to the combined signal 460. In FIG. 5, three WUS 520, 530 and 540 (compare with 320, 330 and 340 of FIG. 3) are multiplexed to the combined signal 560. It should be noted that the demodulation properties of the Manchester coding (that demodulation is not affected by the average symbol value) is preserved after the multiplexing.

Figure 6:
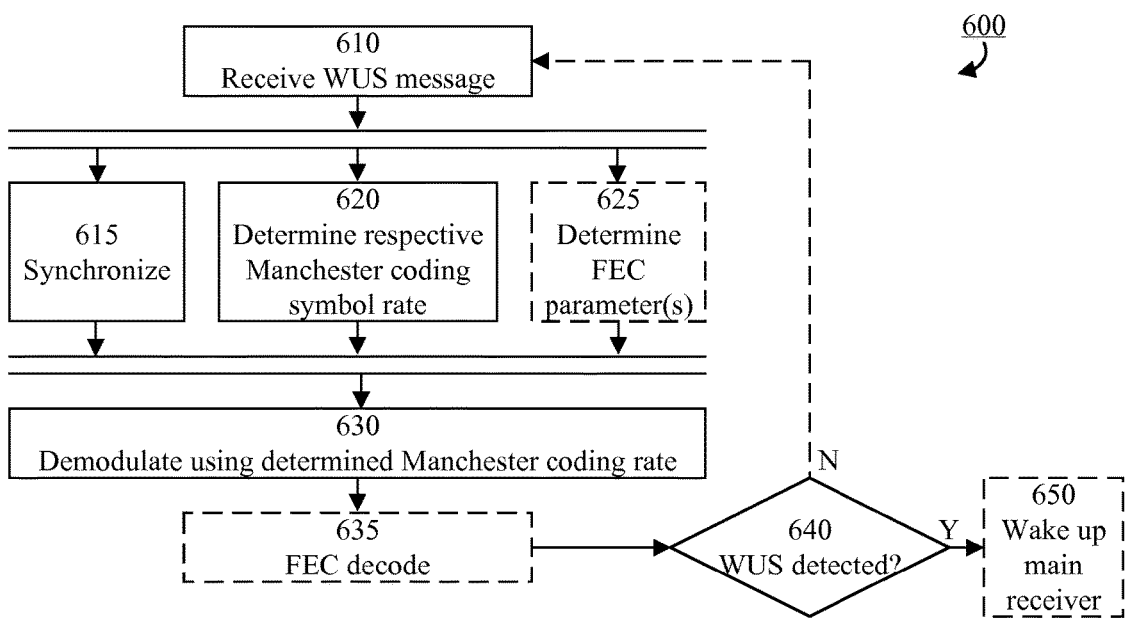
FIG. 6 is a flowchart illustrating example method steps according to some embodiments.

FIG. 6 illustrates an example method 600 of a WUR configured to be comprised in a WCD also comprising a main receiver. The WCD is configured to receive a WUS message transmitted by the network node and comprising two or more multiplexed WUS as described above, wherein one of the WUS (a particular WUS) is for waking up the main receiver of the WCD.

In step 610, the WUS message is received. The Manchester coding symbol rate for the particular WUS is determined in step 620. In FIG. 6, step 620 is illustrated as performed after the reception of the WUS message. However, the determination of Manchester coding symbol rate is typically performed in a negotiation with the network node by the main receiver previous to step 610 where the main receiver is not awake.

The WUS message is demodulated in step 630 using the determined Manchester coding symbol rate and if the particular WUS is detected (Y-path out from step 640) the main receiver is woken up in step 650. If the particular WUS is not detected (N-path out from step 640) the WUR may return to step 610 for reception of another WUS message. The detection of the WUS may be achieved using any suitable approach for WUS detection, e.g. correlation and threshold detection as already known in the art.

If FEC coding is applied to the particular WUS, the method may also comprise determining (possibly in parallel to step 620) parameters of the FEC code, e.g. FEC code rate and/or complexity, as illustrated by optional step 625 and performing FEC decoding as illustrated by optional step 635.

Time synchronization may also be performed (possibly in parallel to step 620 and/or optional step 625) as illustrated by step 615.

Figure 6A:
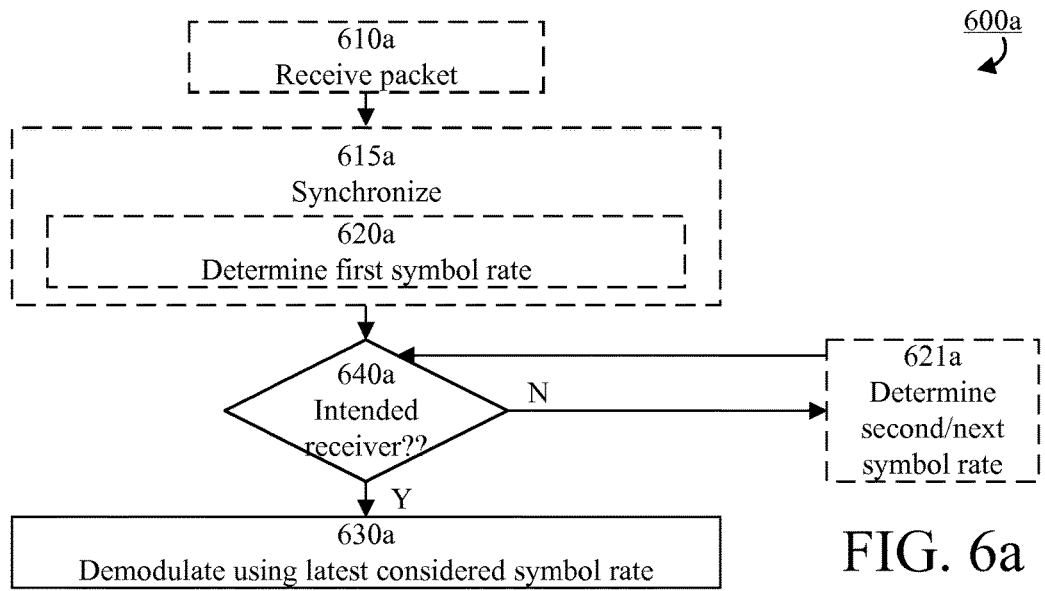
FIG. 6a is a flowchart illustrating example method steps according to some embodiments.

FIG. 6a illustrates an example method 600a for a wireless receiver (e.g., a wireless communication device such as a STA, or a WUR configured to be comprised in a WCD) processing of a received packet according to some embodiments. The method 600a may be considered as an alternative to the method 600. In some embodiments, one or more steps of the method 600a may be merged with corresponding one or more steps of the method 600 to provide other alternative methods. Furthermore, in some embodiments, one or more steps of the method 600a may be combined with one or more steps of the method 600 to provide yet other alternative methods.

In optional step 610a, a packet (e.g., a WUS message) is received. The packet comprises two or more multiplexed signals (e.g., two or more WUS) concurrently transmitted, wherein each signal comprises a message (the data, or payload, for an intended user/receiver; not to be confused with the WUS message) and a prepended address field indicative of an intended receiver of the message. The two or more signals at least partly overlap each other in time, and the address fields are staggered in time. Step 610a may, for example, be implemented as described above in connection with step 610 of FIG. 6 and/or otherwise described herein.

In optional step 615a, the wireless receiver performs synchronization in relation to the received packet. For example, when the received packet comprises a common synchronization part prepended to the multiplexed two or more signals, the wireless receiver may perform synchronization based on the common synchronization part.

As illustrated by optional sub-step 620a, a first symbol rate (the symbol rate of a first signal) may be determined as part of the synchronization step. For example, when the received packet comprises a common synchronization part prepended to the multiplexed two or more signals, sup-step 620a may comprise identifying the symbol rate of the first signal from the common synchronization part.

In a typical example, the symbol rate of the synchronization part corresponds to the first symbol rate; which is the lowest symbol rate among the symbol rates of the two or more signals, and the first address field (that of the first signal) is the earliest address field in time among the staggered address fields of the packet.

In step 640a, it is determined, for the first address field of the address fields, whether the intended receiver of the first address field is the wireless receiver (i.e., whether the message of the first signal is intended for the wireless receiver). The symbol rate identified for the first signal in sub-step 620a may be used for determining whether the intended receiver of the first address field is the wireless receiver. In a typical example, the symbol rate identified for the first signal has been applied when the first address field was generated, thus making it possible for the wireless receiver to interpret the first address field using the first symbol rate; once identified.

When the intended receiver of the first address field is the wireless receiver (Y-path out from step 640a) the method proceeds to step 630a. In step 630a, the first signal of the two or more signals (comprising the first address field) is demodulated using the symbol rate identified for the first signal, to retrieve the first message.

When the intended receiver of the first address field is not the wireless receiver (N-path out from step 640a) the method proceeds to step 621a. In step 621a, a symbol rate of a second signal is identified as a symbol rate which is higher than the symbol rate of the first signal.

In a typical example, the address fields are staggered in time in an order corresponding to an increasing order of the selected respective symbol rates, with a known (absolute or relative) increase between each symbol rate, and the second address field (that of the second signal) is, among the staggered address fields of the packet, a next address field after the first address field in time. For example, the second address filed may be subsequent to the first address field; either directly subsequent or succeeding the first address field after a predetermined guard period.

Returning to step 640a, it is determined, for the second address field of the address fields, whether the intended receiver of the second address field is the wireless receiver (i.e., whether the message of the second signal is intended for the wireless receiver). The symbol rate identified for the second signal in sub-step 621a may be used for determining whether the intended receiver of the second address field is the wireless receiver. In a typical example, the symbol rate identified for the second signal has been applied when the second address field was generated, thus making it possible for the wireless receiver to interpret the second address field using the second symbol rate; once identified.

When the intended receiver of the second address field is the wireless receiver (Y-path out from step 640a) the method proceeds to step 630a. In step 630a, the second signal of the two or more signals (comprising the second address field) is demodulated using the symbol rate identified for the second signal, to retrieve the second message.

When the intended receiver of the second address field is not the wireless receiver (N-path out from step 640a) the method proceeds to step 621a. In step 621a, a symbol rate of a third signal is identified as a symbol rate which is higher than the symbol rate of the second signal, and so on.

The process typically continues until an address field is found that indicates that the wireless receiver is the intended receiver and the corresponding signal is demodulated, or until there are no more address fields in the packet; whichever happens first.

Figure 7:
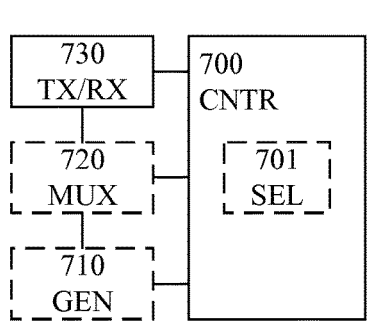
FIGS. 7 through 11 are schematic block diagrams illustrating example arrangements/apparatuses according to some embodiments.

FIG. 7 illustrates an example arrangement/apparatus for a wireless transmitter (e.g., a network node). The example arrangement/apparatus of FIG. 7 may, for example, be configured to perform method steps described in connection with any or both of FIGS. 2 and 2a.

The arrangement is for concurrent transmission of two or more WUS using an OFDM signal generator configured to apply an OFDM symbol rate, wherein each WUS is for waking up a main receiver of a respective WCD responsive to detection of the WUS by a WUR of the WCD.

To this end, the arrangement comprises a controller (CNTR) 700 configured to cause selection (e.g. by a selector (SEL) 701) of a respective Manchester coding symbol rate for each of the two or more WUS, wherein all of the selected respective Manchester coding symbol rates are different from each other, and wherein all Manchester codes having the selected respective Manchester coding symbol rates are orthogonal to each other.

The controller 700 is also configured to cause generation (e.g. by a signal generator (GEN) 710) of each of the two or more WUS using the OFDM signal generator and application of a Manchester code of the selected respective Manchester coding symbol rate.

The controller 700 is also configured to cause multiplexing (e.g. by a multiplexer (MUX) 720) of the two or more WUS for transmission (e.g. by a transceiver (TX/RX) 730) in a WUS message.

When the selected respective Manchester coding symbol rate is lower than the OFDM symbol rate, the generation of the WUS may be implemented by application of the Manchester code to symbols of the WUS and inputting the result to the OFDM signal generator. When the selected respective Manchester coding symbol rate is equal to the OFDM symbol rate divided by two to the power of m, where m is a positive integer, repetition of each of the Manchester coded symbols may be applied to produce two to the power of m identical Manchester coded symbols before inputting the result to the OFDM signal generator.

When the selected respective Manchester coding symbol rate is equal to, or larger than, the OFDM symbol rate the generation of the WUS may be implemented by application of the Manchester code in an on-off keying manner to an output from the OFDM signal generator based on symbols of the WUS. This approach may, alternatively or additionally, be used also when the selected respective Manchester coding symbol rate is lower than the OFDM symbol rate.

Alternatively or additionally, the apparatus of FIG. 7 is for preparing a packet for concurrent transmission of two or more signals, wherein each signal comprises a message and a prepended address field indicative of an intended receiver of the message.

To this end, the apparatus comprises a controlling circuitry (e.g., a controller; CNTR) 700 configured to cause multiplexing (e.g., by multiplexing circuitry—such as a multiplexor—MUX, 720) of the two or more signals for transmission (e.g., by transmitting circuitry—such as a transceiver—TX/RX, 730) in the packet by causing organizing of the two or more signals in time to at least partly overlap each other, wherein organizing of the two or more signals comprises staggering of the address fields in time.

The controller is also configured to cause selection (e.g., by selection circuitry—such as a selector—SEL, 701) of a respective symbol rate for generation of each of the two or more signals, wherein all of the selected respective symbol rates are different from each other, and generation (e.g., by generating circuitry—such as a signal generator—GEM, 710) of each of the two or more signals by application of the selected respective symbol rate to the address field and the message.

Generally, the various parts described above in relation to FIG. 7 may be comprised in, operatively connected to, or otherwise associated with the controller 700, as suitable.

Figure 8:
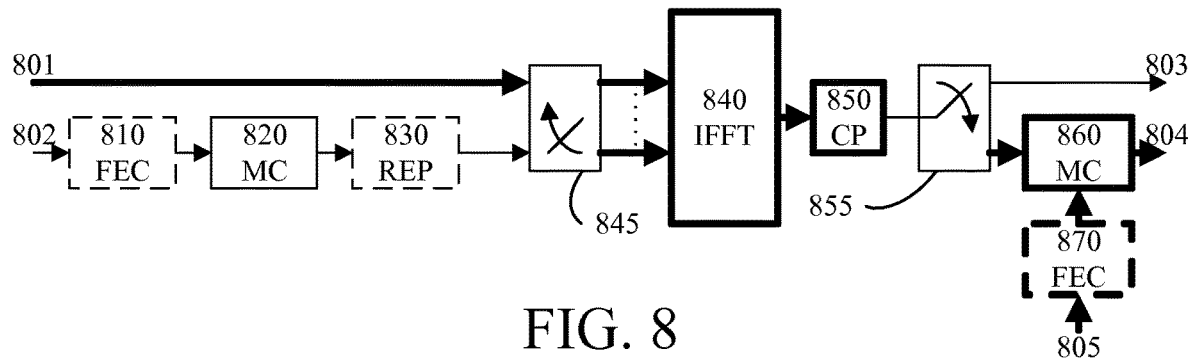

FIG. 8 illustrates an example arrangement for WUS generation using an OFDM signal generator. The arrangement of FIG. 8 may, for example, be used to implement block 710 of FIG. 7. The arrangement comprises two inputs 801, 802, two Manchester encoders (MC) 820, 860, a repeater (REP) 830, two switches 845, 855, an IFFT 840, a cyclic prefix generator (CP) 850, and two outputs 803, 804. Optionally, the arrangement may also comprise FEC encoders 810, 870.

When the selected respective Manchester coding symbol rate is lower than the OFDM symbol rate, the generation of the WUS may be implemented by inputting an OOK signal at 802, letting the switches 845, 855 be in the positions illustrated in FIG. 8, and using the signal at 803 as an output signal. The repeater 830 may be used when the selected respective Manchester coding symbol rate is equal to the OFDM symbol rate divided by two to the power of m to produce two to the power of m identical Manchester coded symbols before inputting the result to the OFDM signal generator. (Other repetition patterns with different factors are also possible.)

When the selected respective Manchester coding symbol rate is equal to, or larger than, the OFDM symbol rate, the generation of the WUS may be implemented by inputting any suitable non-zero signal at 801, letting the switches 845, 855 be in opposite positions to those illustrated in FIG. 8, and using the signal at 804 as an output signal. In this situation, the Manchester coding in 860 is achieved by passing the signal unchanged when the signal level is high according to the Manchester code and blocking (or nulling) the signal when the signal level is low (i.e. zero) according to the Manchester code. Thus, the Manchester code is applied in an on-off keying manner to an output from the OFDM signal generator based on symbols of the WUS.

In some embodiments, an example arrangement for WUS generation using an OFDM signal generator comprises only one input 801, one Manchester encoder (MC) 860, no repeater or switches, an IFFT 840, a cyclic prefix generator (CP) 850, one output 804 and, optionally, one FEC encoder 870, as illustrated by the bold parts of FIG. 8. This arrangement corresponds to a generation of the WUS being implemented by application of the Manchester code in an on-off keying manner to an output from the OFDM signal generator based on symbols of the WUS, regardless of the Manchester coding symbol rate.

The multiplexing of the two or more WUS may be implemented in different parts of the signal generation chain in different embodiments.

In some embodiments, the multiplexing may be performed before the IFFT and after Manchester encoding. Such an approach is particularly applicable for Manchester coding symbol rates lower than the OFDM symbol rate when input 802 and output 803 are used.

In other embodiments, the multiplexing may be performed after the IFFT and after Manchester encoding, i.e. at outputs 803, 804. Such an approach is applicable both for Manchester coding symbol rates lower than the OFDM symbol rate (when input 802 and output 803, or input 801 and output 804, are used) and for Manchester coding symbol rates equal to, or larger than, the OFDM symbol rate (when 801 and output 804 are used).

Figure 9A:
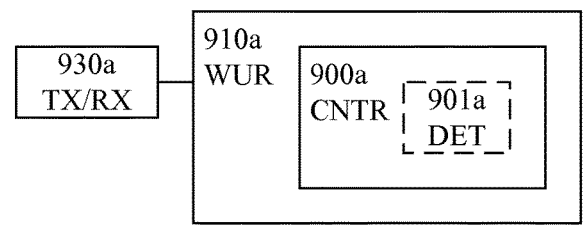

FIG. 9A illustrates an example arrangement for a WUR 910a comprised in a WCD also comprising a main receiver. The example arrangement of FIG. 9A may, for example, be configured to perform method steps described in connection with FIG. 6.

The arrangement comprises a controller (CNTR) 900a configured to cause reception of the WUS message (e.g. by a transceiver (TX/RX) 930a) and determination of which of the selected respective Manchester coding symbol rates to apply (e.g. by a determiner (DET) 901a, for example comprised in the WUR as illustrated in FIG. 9A or comprised in the main receiver not illustrated in FIG. 9A). The controller is also configured to cause demodulation of the WUS message using the determined Manchester coding symbol rate, determination of whether the particular WUS is detected, and waking up of the main receiver responsive to detection of the particular WUS.

Figure 9B:
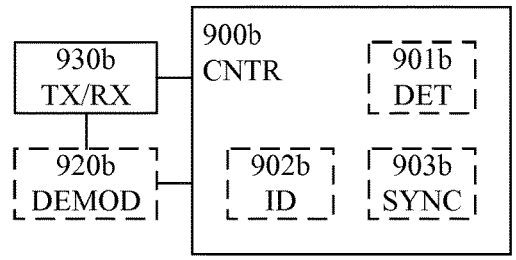

FIG. 9B illustrates an example arrangement/apparatus for a wireless receiver (e.g., a WUR comprised in a WCD also comprising a main receiver). The example arrangement/apparatus of FIG. 9B may, for example, be configured to perform method steps described in connection with any or both of FIGS. 6 and 6a.

The arrangement comprises a controller (CNTR) 900b configured to cause reception of the WUS message (e.g. by a transceiver (TX/RX) 930b) and determination of which of the selected respective Manchester coding symbol rates to apply (e.g. by a determiner (DET) 901b, for example comprised in the WUR as illustrated in FIG. 9B or comprised in the main receiver not illustrated in FIG. 9B). The controller is also configured to cause demodulation of the WUS message using the determined Manchester coding symbol rate, determination of whether the particular WUS is detected, and waking up of the main receiver responsive to detection of the particular WUS.

Alternatively or additionally, the apparatus of FIG. 9B is for processing of a received packet comprising two or more multiplexed signals concurrently transmitted, wherein each signal comprises a message and a prepended address field indicative of an intended receiver of the message, wherein the two or more signals at least partly overlap each other in time, and wherein the address fields are staggered in time. The packet is received by receiving circuitry—such as a transceiver—TX/RX, 930b.

To this end, the arrangement comprises a controlling circuitry (e.g., a controller; CNTR) 900b configured to cause determination (e.g., by determining circuitry—such as a determiner—DET, 901b), for an address field, of whether the intended receiver of the address field is the wireless receiver, and—responsive to the intended receiver of the address field being the wireless receiver—demodulation (e.g., by demodulating circuitry—such as a demodulator—DEMOD, 920b) of a signal of the two or more signals comprising the address field.

The controller 900b is also configured to cause synchronization (e.g., by synchronizing circuitry—such as a synchronizer—SYNC, 903b) using a common synchronization part prepended to the multiplexed two or more signals.

The controller 900b is also configured to cause identification (e.g., by identifying circuitry—such as an identifier—ID, 902b) of the symbol rate of the signal and using of the identified symbol rate for the determination of whether the intended receiver of an address field is the wireless receiver.

Generally, the various parts described above in relation to FIG. 9B may be comprised in, operatively connected to, or otherwise associated with the controller 900b, as suitable.

Figure 10:
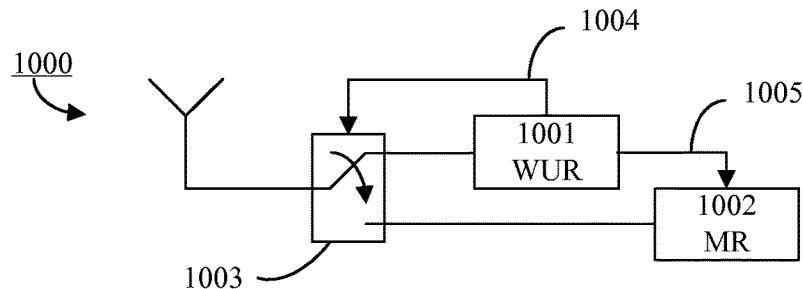

FIG. 10 schematically illustrates an example arrangement 1000 comprising a WUR 1001 and a main receiver (MR) 1001. Parts of the arrangement of any of FIGS. 9A and 9B may, for example, be comprised in block 1001 of FIG. 10.

In a low power mode, the main receiver 1002 is turned off (or set to sleep mode, or similar) and the switch 1003 is set to the position shown in FIG. 10. When the WUR detects a WUS, it causes a change of the position of the switch (illustrated by control signal 1004) and a wake-up of the main receiver (illustrated by control signal 1005).

It should be understood that other implementations using a WUR may be equally applicable in the context presented herein, and that the structure of FIG. 10 is merely provided as an example. For example, the switch 1003 may be replaced by circuitry providing a similar function or there may be one antenna for the WUR and one for the main receiver (rendering the switch unnecessary).

Figure 11:
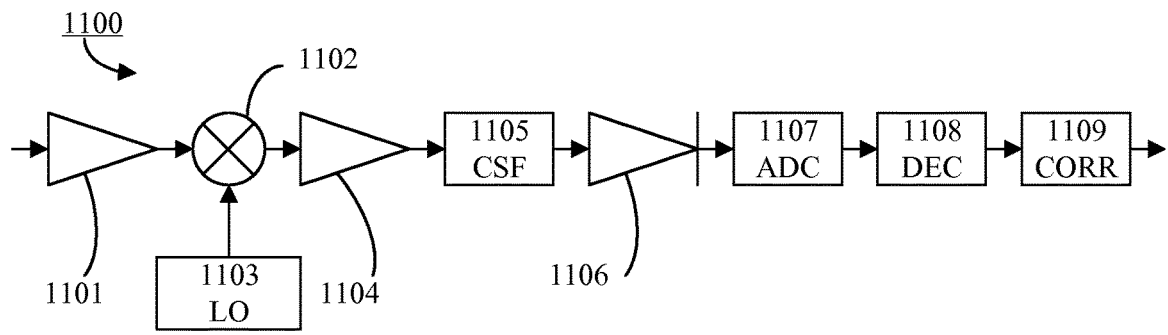

FIG. 11 schematically illustrates an example WUR reception chain 1100 according to some embodiments. Parts of the arrangement of FIG. 11 may, for example, be comprised in block 1001 of FIG. 10 and/or in block 910a of FIG. 9A.

The WUR reception chain of FIG. 11 comprises a low noise amplifier (LNA) 1101 and a mixer 1102 for mixing the output of the LNA with a local oscillator (LO) signal 1103. The output of the mixer is provided to a channel selection filter (CSF) 1105 after having passed a further amplifier 1104, and the filtered signal is input to an envelope detector 1106. At the output of the envelope detector, there is provided an analog-to-digital converter (ADC) 1107, a decoder (DEC) 1108 for Manchester decoding and—when applicable—FEC decoding, and a correlator (CORR) 1109.

Figure 12:
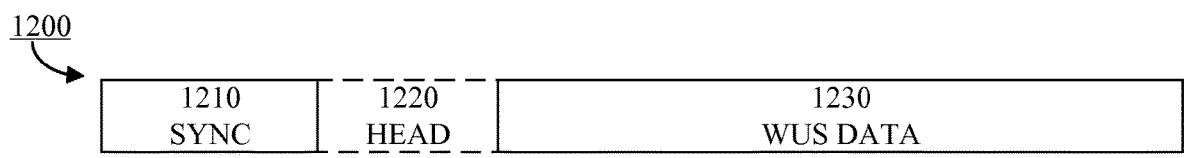
FIG. 12 is a schematic drawing illustrating an example WUS message according to some embodiments.

FIG. 12 schematically illustrates an example WUS message 1200 according to some embodiments. The WUS message comprises a first part (SYNC) 1210 for time synchronization and a second part (WUS DATA) 1230 comprising the multiplexed two or more WUS. The WUS message may optionally comprise a header part (HEAD) 1220 between the first and second parts.

The first part (synchronization part) is typically for time synchronization by all of the WCD the WUS message is directed to and is common for all of the WCD (i.e. no differentiated encoding and multiplexing). The first part may consist of a single, specific, predetermined sequence or it may comprise one of several alternative sequences (thereby able to convey information). Such conveyed information may, for example relate to one or more of; FEC coding parameters (e.g. FEC code rate), message duration, and Manchester coding symbol rate (e.g. a lowest used symbol rate). Alternatively or additionally, such information may be comprised in the header part. Thus, the first part and/or the header part may be used in one or more of the steps 615, 620 and 625 of FIG. 6, and/or one or more of the steps 615a, 620a, 621a and 640a of FIG. 6a.

Thus, the first part of the packet (e.g. denoted syncword) is used for synchronization of the receiver. This first part could enable packet detection, fine time synchronization, and frequency estimation. The syncword could typically be a known signal that the receiver would be searching for by means of a correlator.

In some examples, the receiver might continue the processing by demodulating the header part of the packet once the syncword has been found. The packet header may contain information like WUS duration, WUS data rate, and FEC code parameters.

One way to create syncwords that would be orthogonal is by using the approach described above. Another alternative for syncword creation is to use a sequence with good auto-correlation properties, e.g. a maximum length pseudo noise (PN) sequence generated by a maximum length shift register (MLSR).

Once a receiver has demodulated the header, it has the necessary information (e.g. Manchester coding symbol rate and FEC coding parameters) to demodulate the WUS data part of the packet.

In various embodiments, there are different ways for the WCD to determine which Manchester coding symbol rate (and which FEC rate) to apply in the detection process.

In some approaches, the WUS format (including one or more of the rates) is negotiated or defined using the main receiver. Typically, the same WUS can be used every time a WUS is sent to wake up a particular main receiver, but in principle the WUS may be changed in these approaches anytime the main receiver is awake.

In some approaches, some WUS format parameters may be conveyed by the first part and/or the header part as indicated above. In such approaches the parameters may be directed to a particular WUR via inclusion of a WCD (or WUR) identifier in the first part and/or the header part.

Even though such an identifier implicitly states that there is a WUS directed to the WUR associated with the identifier, there may be some use in combining the detection of the identifier with WUS decoding and detection. For example, if an identifier is wrongly detected the WUS processing (e.g. via a cyclic redundancy check—CRC—included in the WUS) may reveal the error and unnecessary wake-up of the main receiver may be avoided. Furthermore, if the WUS is used for other purposes than waking up a main receiver (e.g. to carry small pieces of data) the application of the identifier is very much relevant.

Generally, there may be different ways to determine which (different) symbol rates (not necessarily Manchester coding rates) apply to two or more signals (not necessarily WUS) transmitted concurrently; some of which will be detailed in the following.

As will be seen in the following, the address fields may be staggered in time in an order corresponding to an increasing order of the selected respective symbol rates, with a known (absolute or relative) increase between each symbol rate. Thereby, once the lowest symbol rate is known, the other symbol rates are easily determined (typically recursively) as needed.

The lowest symbol rate may be negotiated or defined beforehand, or may be retrievable form the synchronization part. Typically, the same lowest symbol rate can be used every time a packet is sent, but in principle the lowest symbol rate may be dynamically or semi-statically changed.

In some approaches, the WUS format (including one or more of the rates) is negotiated or defined using the main receiver. Typically, the same WUS can be used every time a WUS is sent to wake up a particular main receiver, but in principle the WUS may be changed in these approaches anytime the main receiver is awake.

In some approaches, some WUS format parameters may be conveyed by the first part and/or the header part as indicated above. In such approaches the parameters may be directed to a particular WUR via inclusion of a WCD (or WUR) identifier (address field) in the header part.

Figure 12A:
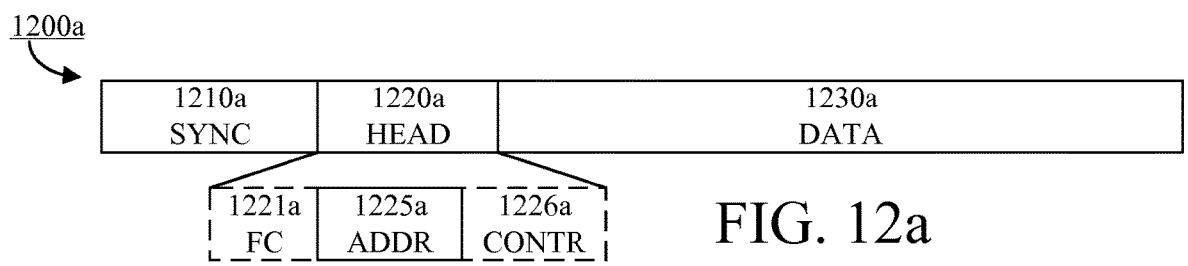
FIGS. 12a, 12b and 12c are schematic drawings illustrating example packet structures according to some embodiments.
Figure 12B:
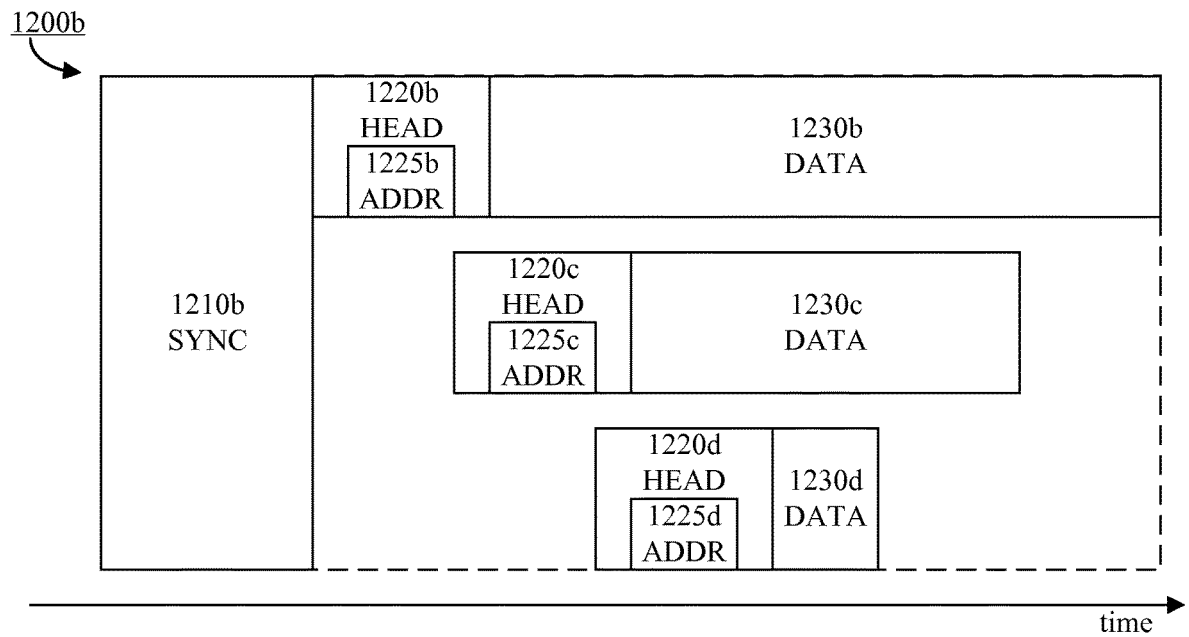

With reference to FIGS. 12*a* and 12*b*, a packet structure will be exemplified which enables use of the same synchronization sequence for all signals in a packet, as well as efficient addressing of different wireless receivers with different, but concurrently transmitted, sub-packets having different symbol rates.

FIG. 12*a* schematically illustrates an example packet (e.g., a WUS message) 1200*a* according to some embodiments. The example packet 1200*a* includes a single signal for a single intended receiver to illustrate the basic packet structure of these embodiments.

The packet 1200*a* comprises a synchronization part (SYNC) 1210*a* for time synchronization and a message part (DATA) 1230*a* comprising the message for the intended receiver. The packet also comprises a header part (HEAD) 1220*a* prepended to the message part. The header part comprises an address field (ADDR) 1225*a* indicative of the intended receiver of the message of the message part.

Optionally, the header part may also comprise other fields; exemplified in FIG. 12*a* by a frame control field (FC) 1221*a* and a general control field (CONTR) 1226*a*. The frame control field may be indicative of information related to the signal for the intended receiver (e.g., one or more of: length of the message part, total length of the header part plus the message part, symbol and/or coding rate of the message part, etc.). The general control field may be indicative of other information related to the signal for the intended receiver. For example, the general control filed may be a type dependent (TD) control field.

FIG. 12*b* schematically illustrates an example packet (e.g., a WUS message) 1200*b* according to some embodiments. The example packet 1200*b* includes three signals for three respective intended receivers to illustrate the staggering of address fields in time.

The packet 1200*b* comprises a synchronization part (SYNC) 1210*b* for time synchronization. The synchronization part is typically for time synchronization by all of the intended receivers of the packet and is common for all of the intended receivers. Typically, the synchronization part may consist of a single, specific, predetermined sequence. The synchronization part may be related to the lowest symbol rate among the different symbol rates used for the intended receivers. Such a lowest symbol rate may be known beforehand (e.g., it may be pre-determined, or it may be dynamically or semi-statically negotiated before transmission of the packet) or may be conveyed by the synchronization part. Thus, the synchronization part may be used in one or more of the steps 615*a* and 620*a* of FIG. 6*a*.

Each of the three signals comprises a message part (DATA) 1230*b*, 1230*c*, 1230*d* comprising the message for the respective intended receiver and a header part (HEAD) 1220*b*, 1220*c*, 1220*d* prepended to the respective message part and comprising a respective address field (ADDR) 1225*b*, 1225*c*, 1225*d* indicative of the respective intended receiver.

The total length of the header plus message parts may be different as illustrated in FIG. 12*b*. For example, this may be due to that the message parts are of different lengths and/or due to that different symbol rates are used for the different messages. Typically, when each message is a WUS, they may be encoded using different Manchester coding rates as described earlier herein.

The three signals are multiplexed for concurrent transmission in the packet by organizing the two or more signals in time to at least partly overlap each other, while staggering the address fields in time. In a typical implementation, the address fields are staggered in time in an order corresponding to an increasing order of the selected respective symbol rates, with a known (absolute or relative) increase between each symbol rate. This is illustrated in FIG. 12*b* in that:

the header of the signal carrying message 1230*b* is placed directly after the synchronization part, since this signal is generated using a lowest symbol rate (the same symbol rate as used for the synchronization part), the header of the signal carrying message 1230*c* follows then, since this signal is generated using a next lowest symbol rate, and the header of the signal carrying message 1230*b* is placed last among the headers of the three signals, since this signal is generated using a highest symbol rate.

Generally, staggering the address fields in time may be defined as placing the address fields in a non-overlapping sequence in time, and/or placing the address fields in time such that the address fields follow each other; one after another.

Typically, the address fields should be staggered to enable a receiver to check whether it is the intended receiver indicated by a first address field, and if that is not the case, to check whether it is the intended receiver indicated by a second address field, and so on. Thus, the address fields should typically not overlap each other. If applicable, a guard time may be used between address fields in time to allow reconfiguration of the receiver for processing of the next address field (e.g., using a different symbol rate).

Thus, the staggering of the address fields may comprise letting a next (e.g., second) address filed start directly when the previous (e.g., first) address field has ended, or letting the next address filed start when a guard time has elapsed after the previous address field has ended.

In FIG. 12b, the address fields are staggered such that the header field comprising the next address filed starts directly when the previous address field has ended. An alternative might be to stagger the address fields such that the header field comprising the next address filed starts directly when the header field comprising the previous address field has ended.

In typical embodiments, the address fields may be staggered in time in an order corresponding to an increasing order of the selected respective symbol rates, with a known (absolute or relative; e.g., differing by a factor, such as $2^n$) increase between each symbol rate. Thereby, once the lowest symbol rate is known, the other symbol rates are easily determined (typically recursively) as needed.

Of course, the packet structures of FIG. 12a and/or 12b (and the related principles described in connection thereto) may be used in combination with features of the WUS message structure of FIG. 12 to provide a WUS message where two or more WUS are multiplexed with staggered address fields.

Although it is not necessary to have a same synchronization sequence for all of the intended receivers (users), it may be advantageous to let all the users use the same signal to obtain synchronization. The reason for this is that the total transmitted power would typically be limited and if several orthogonal synchronization sequences should be used (one for each targeted user) the power that can be used for each individual synchronization sequence would be reduced correspondingly.

Thus, a packet structure for multiplexing signals of different data (symbol) rates is provided. In typical embodiments, two or more WUS are multiplexed by using simple orthogonal codes, and transmitted on the same frequency to not increase the requirements on frequency generation or filtering. Construction of the orthogonal codes may utilize Manchester coding, which means that the construction can be made such that the multiplexing of signals is completely transparent for the different receivers. This also means that the approaches herein can be introduced at a late stage in a standardization process; allowing multiplexing of signals intended for legacy receivers.

Control signaling that may be needed for the reception of the packet, including the synchronization sequence, may be designed as disclosed herein. This has the advantage that the multiplexing can be introduced with no or very minor impact on a system originally designed without the multiplexing capability.

Advantages of various embodiments further include provision of a simple and flexible way to multiplex signals when the Manchester coding is used. The multiplexing may be completely transparent for the receiver and can therefore be introduced to an already existing standard or possibly be introduced as a proprietary feature.

Although it may be desirable to multiplex data to different users as elaborated on herein, it may be argued that it may be advantageous to let all users use the same signal to obtain synchronization. The reason for this is that the total transmitted power may typically be limited and if several orthogonal synchronization sequences would be used, one for each targeted user (intended receiver), the power that can be used for each individual sequence will be reduced correspondingly.

Another practical problem which needs to be considered is how to signal to the two or more receivers which symbol rate has been selected for the different intended receivers.

Figure 12C:
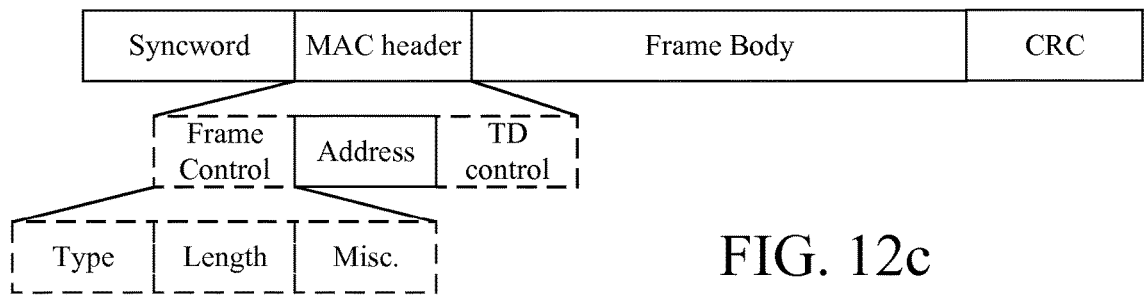

Both these issues—synchronization and symbol rate information—may be solved by application of the packet structure illustrated in FIG. 12c (which may be seen as a variant of the structure illustrated in FIG. 12a).

The first part of the packet in FIG. 12c comprises (e.g., contains) a syncword which is used by the receiver(s) to find time synchronization. Potentially, the syncword may also be used for other purposes; e.g., frequency synchronization, automatic gain control (AGC) training, etc. A medium access control (MAC) header is located after the syncword.

In some packet structure implementations, it may be assumed that the header comprises headers for the different signals and is encoded using orthogonal Manchester coding as described above, or that the header contains non-multiplexed information to the individual receivers indicating, e.g., data (symbol) rates.

Although these approaches may be feasible if the system is designed for signal multiplexing within a packet from the start, such approaches may not be suitable if signal multiplexing capability is added at a later stage of system design.

Furthermore, the performance of the header may be degraded if the above approaches are used. If all receivers are addressed by the same header without multiplexing, the degradation may be in terms of more overhead since the length (and thereby the duration) of the header may need to be increased. If the header information intended for the different receivers is multiplexed, the degradation may be in terms of performance since the total received power may need to be shared between two or more orthogonal steams.

Yet another drawback of multiplexing the headers is that a potential receiver typically does not know which data (symbol) rate it is addressed by. Therefore, the receiver may typically need to demodulate using several (and possibly all) possible data rates in order to find out whether it is addressed in the packet; and if so, which symbol rate is applicable for the message.

To avoid at least some of the mentioned or other disadvantages when multiplexing two or more signals in a single packet, it is a packet structure as the one illustrated in FIG. 12c may be adopted. Specifically in this example, the same syncword is used for all receivers, irrespectively of what data rate is used to address them; and the control data fields (at least the address fields) are staggered in time. Preferably the staggering is done such that the control data for a lower data rate comes before the control data for a higher data rate.

In the example of FIG. 12c, the control data is transmitted in the MAC header, and may comprise information like Frame Control (e.g., whether it is a broadcast packet or a unicast packet), an address field (which—in the case of a broadcast packet—may be the address of the transmitter, and—in the case of a unicast packet—may be the address of the intended receiver). In some embodiments, there may be additional control information depending on the type of packet, which is illustrated by Type Dependent (TD) Control in FIG. 12c.

In one example, the frame control may comprise 8 bits (3-4 for indicating type, 3-4 to indicate length and/or being miscellaneous, 0-2 reserved), the address may comprise 12 bits, and the TD control may comprise 12 bits. This example may be particularly applicable to WUS transmission, e.g., in the context of IEEE802.11 standards.

In case there would be no multiplexing, an attractive means to signal to a receiver which data rate is used is by using different syncwords for different rates. However, as mentioned above it may be desirable in multiplexing scenarios to use a single syncword in order to keep overhead and/or performance at acceptable levels.

Therefore, one suitable packet structure entails that the syncword used for the packet carrying multiplexed signals is the syncword which is used for a packet carrying information of the lowest symbol rate of the multiplexed signal. Immediately after the syncword is received, the receiver may therefore continue to process the signal after the syncword according to the lowest symbol rate as if the packet was not a multiplexed packet.

In one example, multiplexing is explicitly indicated in the MAC header. According to this example, an indication that the packet is carrying multiplexed data is signaled in (at least the first) MAC header. This may, for example, be implemented using the Frame Control field by defining multiplexing as a specific packet type. A receiver processing the MAC header will thereby know whether, in addition to the signal using the lowest symbol rate, other signal(s) are multiplexed in the packet using a higher rate.

The receiver may continue to process the address field in the first MAC header to determine if it is addressed using the lowest data rate. If the receiver identifies its own address in the address field, it may continue to process the remaining part of the packet using the lowest rate; i.e., in the same way as if no multiplexing was applied. Typically, the receiver will not search for additional information in multiplexed streams in this case. However, if the receiver does not identify its own address in the address field of the first MAC header (at the lowest rate), the receiver shifts (reconfigures) to a higher data rate and to process the address field in the next (second) MAC header to determine if it is addressed using the higher data rate. The process is repeated until all rates have been tried or until the receiver identifies its own address in an address field.

According to some embodiments, the very same structure for the MAC header is used for all rates; preferably maintaining orthogonality between rates as described earlier.

The MAC header(s) transmitted at higher rate(s) are successively delayed compared to the transmission of the first MAC header. The delay applied to the MAC header(s) transmitted at the higher rate(s) should typically be selected such that the receiver can switch to processing at the applicable (higher) rate after having processed the previous address field and identified that it is not addressed therein.

An alternative approach is to indicate multiplexing by a specific bit, rather than by a defined packet type. This approach may be easily implemented if there is a reserved bit available in the MAC header; a bit that is ignored by legacy devices. Multiplexing of two or more signals may then be implemented in a way that would be transparent for legacy devices.

In one other example, multiplexing is not explicitly indicated. According to this example, multiplexing is supported by negotiation of this feature already before the packet is transmitted, so that devices capable of multiplexing will process the packet by first running the receiver at the lowest data rate and, if the address is not found, switch to a higher data rate in a continued quest for its own address; similarly to the description above.

A legacy receiver does not need to be aware of the multiplexing in this example, but will just process the packet at the lowest data rate and, if the address is not found, simply abort the processing.

An example scenario where this example may be useful is when OOK is used for a wake-up signal transmitted to a wake-up radio; in which case the multiplexing would correspond to the ability to address two or more wake-up radios with the same packet. The negotiated feature of multiplexing may, in such scenarios, typically be done using the main radio. Thus, once the main radio is turned off and the wake-up radio is activated, the wake-up radio is aware of the multiplexing of wake-up signals and may operate accordingly.

Generally, it may be advantageous, but not necessary, to multiplex the signals such that an address field using a relatively low rate is transmitted before an address field using a relatively high rate.

One advantage with this approach is that the syncword (if only one syncword is used), selected to indicate the rate of the first appearing address field, is robust enough for all rates; including the lowest rate.

Another advantage with this approach is that the duration of the packet may be kept low. Typically, a signal using a high data rate has a shorter duration than a signal using a low data rate (provided the raw data size is the same, or at least does not differ by more than the difference ratio between the data rates). Thus, staggering the signals such that the address fields relating to low rates are located first in time, avoids unnecessarily prolonging the packet due to multiplexing. This principle is illustrated in FIG. 12b, where the duration of the different message fields are made proportionally shorter to reflect that the data rate is higher (although the headers have not been correspondingly shortened, as they may typically be in some embodiments).

In some variants of the embodiments disclosed herein, two or more WUS comprise of a first WUS and a second WUS. In these variants, the method comprises selecting a Manchester coding symbol rate for the first WUS (and possible for the rest of the two or more WUS, excluding the second WUS) and generating the first WUS (and the rest of the WUS, excluding the second WUS) using the OFDM signal generator and application of a Manchester code of the selected Manchester coding symbol rate. In these variants, the method further comprises generating the second WUS as a non-Manchester coded WUS using on-off keying and the OFDM signal generator and multiplexing the first and second WUS for transmission in a WUS message.

Figure 13:
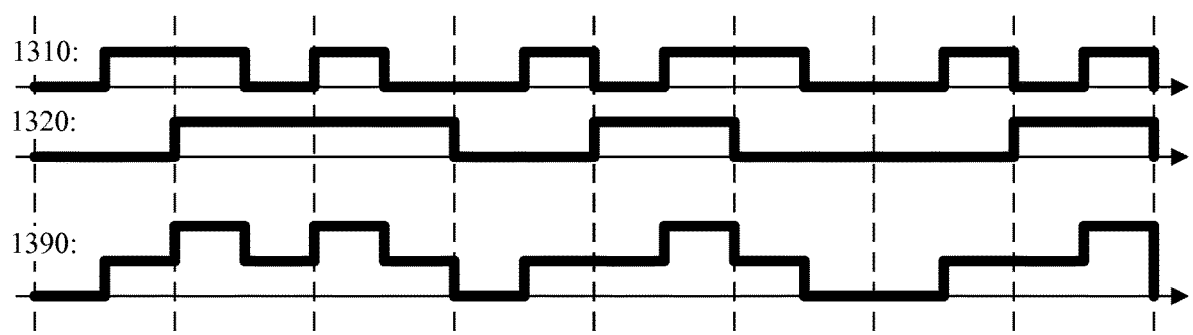
FIG. 13 is a schematic timing diagram illustrating multiplexing of different WUS according to some embodiments.

FIG. 13 is a schematic timing diagram illustrating multiplexing two WUS of the same WUS symbol rate; a Manchester coded WUS 1310 and a non-Manchester coded WUS 1320. The result is illustrated as 1390 and this signal is transparent to the WUR demodulating the Manchester coded WUS 1310. In this case, the OOK symbol rate needs to be a power of 2 factor relation to the Manchester coding symbol rate. In principle, it is conceivable to have only one WUS using the Manchester coding combined with a non-Manchester coded WUS (not shown).

Thus, some embodiments relate to methods and arrangements for low complex multiplexing of Manchester coded signals. Two or more WUS are multiplexed by using simple orthogonal codes and are transmitted on the same frequency to avoid increasing the requirements on the receiver regarding frequency generation and/or filtering. The construction of the orthogonal codes using Manchester coding leads to that the multiplexing of signals is completely transparent to the receivers. Furthermore, the approach can be introduced at a late stage in a standardization process since it allows multiplexing with signals for legacy receivers.

Some examples will be presented in the following when a specific system is applied with specific parameters. It should be noted that this is merely for illustrative purposes and not intended as limiting.

In these examples it is supposed that the system is based on IEEE 802.11, that the channel bandwidth is 20 MHz, that a 64-point inverse fast Fourier Transform (IFFT) is used to generate the signal and that a cyclic prefix (CP) is added to the signal after the IFFT processing as is commonplace when orthogonal frequency division multiplexing (OFDM) is used.

The sampling rate used in IEEE 802.11 for a 20 MHz channel bandwidth is 20 MHz, and a commonly used length of the CP is 16 samples or 800 ns, which means that the duration of an OFDM symbol will correspond to 80 samples or 4 us, i.e., the OFDM symbol rate of the is 250 ksymbols/s.

When the WUS symbol rate is 125 ksymbols/s or less, the WUS at the input to the IFFT is either present (non-zero) or absent (zero). Manchester coding may then simply achieved by representing a logical zero with WUS being absent for one symbol (i.e., 4 us) followed by the WUS being present for the next symbol, i.e., the following 4 us, so that the duration of one information bit in the WUS sequence will be 4+4=8 us (compare with 330 of FIG. 3 and the 802/803 alternative of FIG. 8). If the WUS symbol rate is N (=$2^m$) times lower than the OFDM symbol rate, the WUS signal may be generated by repeating the Manchester coded bits before inputting them to the IFFT (compare with 340, 350 of FIG. 3 and the 802/803 alternative of FIG. 8).

When the WUS symbol rate is higher than 125 ksymbols/s, the Manchester coding may be done after the IFFT processing (compare with 310, 320 of FIG. 3 and the 801/804 alternative of FIG. 8), whereby the Manchester coding block (860 of FIG. 8) effectively masks out part of the signal generated by the IFFT block. As an example, if the WUS symbol rate is to be 250 ksymbols/s, a Manchester coded symbol needs to be produced every 4 us. This can be achieved by either masking the first half of the 4 us signal or by masking the second half of the 4 us symbol, to represent a logical zero and a logical one, respectively. The masking may be done in various ways. For example, the corresponding samples may simply be set to zero with or without application of a smoothing windowing function to obtain better spectrum properties of the transmitted signal.

As mentioned before, the Manchester coding may be supplemented by application of a forward error correcting (FEC) code, wherein the FEC coding is typically performed prior to the Manchester coding.

As shown above, Manchester coded signals of different Manchester coding symbol rates may be generated using essentially the same hardware, which enables creation of WUS that are orthogonal to one another as explained above. The composite signal (e.g. 460 and 560) after multiplexing the constituent signals is merely the sum of the constituent signals since all relevant blocks in the transmitter are linear.

Returning to FIG. 4, demodulation of 420 and 430 will now be investigated assuming an OFDM symbol rate of 250 ksymbols/s. It is easily realized that Manchester demodulation (as previously described) of 420 is not affected by 430 since 430 is always constant during each Manchester coded symbol of 420. In the demodulation of 430, 420 always contributes with an equal amount of power to $r_1$ and $r_2$ since each of $r_1$ and $r_2$ are calculated for 430 over an entire symbol Manchester coded symbol of 420.

It should be noted that the orthogonality is not affected if a FEC code is employed in addition. The possibility to add a FEC code independently of the Manchester coding is extremely beneficial, and greatly extends the usefulness of the approaches presented herein.

A large number of orthogonal sequences may be obtained via Manchester coding by successively decreasing the WUS symbol duration a factor of two for each added WUS. However, the performance of these WUS will be increasingly poor. This is because the received signal power per WUS symbol, and thus the corresponding received signal-to-noise-ratio (SNR), will decrease by 3 dB for every doubling of WUS symbol rate. This may be counteracted by application of a FEC code, which enables using a WUS symbol rate for transmission of a WUS with a WUS data rate that differs from the WUS symbol rate by just choosing a suitable rate for the FEC code.

In an example where a FEC code is applied, it is supposed that two WUS are to be multiplexed, both having a WUS data rate of 250 ksymbols/s. This can be achieved by using Manchester coded sequences having respective rates 250 ksymbols/s and 500 ksymbols/s, where a FEC of rate ½ is applied to the latter so that the WUS data rate is the desired 250 ksymbols/s.

A reduced rate Manchester code may be seen as a repetition code of a higher rate Manchester code. Since it is commonly known that it is possible to obtain better coding performance with e.g. a convolutional code or an algebraic block code, than with a repetition code, increasing the symbol rate and at the same time decreasing the code rate of the FEC code correspondingly is a means to increase the performance at the cost of a slightly increased complexity.

The combination of Manchester coding and FEC coding gives great flexibility. In particular, it enables the same WUS data rate to be used for several receivers. However, sometimes it may be desirable to use different WUS data rates. For example, when the receiver targeted by a first signal, $s_1$, has rather poor channel conditions whereas the receiver targeted by a second signal, $s_2$, has more favorable channel conditions, it may be appropriate to use a higher WUS data rate for $s_2$ than for $s_1$.

Although it may be desirable to multiplex data to different users, it may be advantageous to let all the users use the same signal to obtain synchronization. The reason for this is that the total transmitted power would typically be limited and if several orthogonal synchronization sequences should be used (one for each targeted user) the power that can be used for each individual synchronization sequence would be reduced correspondingly. Another practical aspect which needs to be considered is which Manchester coding symbol rate is to be selected for the each receiver. The rather generic packet (or message) structure presented in FIG. 12 may be used to address synchronization.

The first part of the packet (e.g. denoted syncword) is used for synchronization of the receiver. This first part could enable packet detection, fine time synchronization, and frequency estimation. The syncword could typically be a known signal that the receiver would be searching for by means of a correlator.

In some examples, the receiver might continue the processing by demodulating the header part of the packet once the syncword has been found. The packet header may contain information like packet duration, WUS data rate, and FEC code parameters.

Alternatively or additionally, such information may be comprised in the syncword in the sense that different syncwords could be used depending on the information to be conveyed. Then, the header part may be omitted.

One way to create syncwords that would be orthogonal is by using the approach described above. Another alternative for syncword creation is to use a sequence with good auto-correlation properties, e.g. a maximum length pseudo noise (PN) sequence generated by a maximum length shift register (MLSR).

Assuming that the same syncword is used for all receivers targeted by the packet, the header may either be encoded using orthogonal Manchester coding as described above, or all devices may read the header and explicit information may be included in the header to target the individual receivers.

Once a receiver has demodulated the header, it has the necessary information (e.g. Manchester coding symbol rate and FEC coding parameters) to demodulate the WUS data part of the packet.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless receiver (e.g., a wireless communication device, such as a STA) or a wireless transmitter (e.g., a network node, such as an AP).

Embodiments may appear within an electronic apparatus (such as a wireless transmitter or a wireless receiver) comprising arrangements, circuitry, and/or logic according to any of the embodiments described herein. Alternatively or additionally, an electronic apparatus (such as a wireless transmitter, a wireless communication device, a wireless receiver or a network node) may be configured to perform methods according to any of the embodiments described herein.

Figure 14:
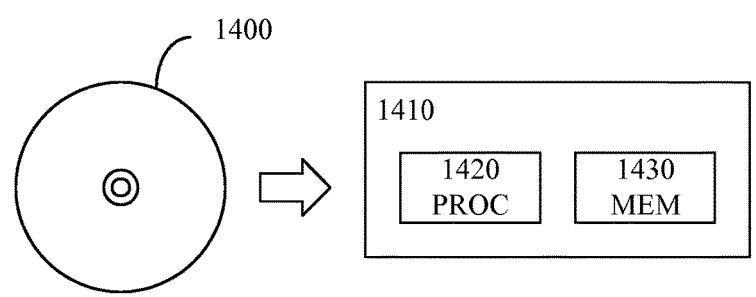
FIG. 14 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 14 illustrates an example computer readable medium in the form of a compact disc (CD) ROM 1400. The computer readable medium has stored thereon a computer program comprising program instructions. The computer program is loadable into a data processor (PROC) 1420, which may, for example, be comprised in a wireless transmitter, a wireless communication device, a wireless receiver or a network node 1410. When loaded into the data processing unit, the computer program may be stored in a memory (MEM) 1430 associated with or comprised in the data-processing unit. According to some embodiments, the computer program may, when loaded into and run by the data processing unit, cause execution of method steps according to, for example, any of the methods illustrated in FIGS. 2, 2a, 6, 6a, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the items are intended to be embraced therein.

At Least Parts of the Disclosure may be Summarized by the Following Items:

1. A method of a wireless transmitter, for preparing a packet (1200b) for concurrent transmission of two or more signals, wherein each signal comprises a message (1230b, 1230c, 1230d) and a prepended address field (1225b, 1225c, 1225d) indicative of an intended receiver of the message, the method comprising:
   multiplexing (230a) the two or more signals for transmission in the packet by organizing the two or more signals in time to at least partly overlap each other, wherein organizing the two or more signals comprises staggering the address fields in time.

2. The method of item 1, further comprising prepending (240a) a common synchronization part (1210b) to the multiplexed two or more signals.

3. The method of any of items 1 through 2, further comprising transmitting (250a) the packet addressing the intended receivers.

4. The method of any of items 1 through 3, wherein each of the two or more signals are generated by application of on-off keying, OOK, or binary frequency shift keying, BFSK.

5. The method of any of items 1 through 4, wherein the two or more signals are two or more wake-up signals, WUS.

6. The method of any of items 1 through 4, further comprising:

selecting (210*a*) a respective symbol rate for generation of each of the two or more signals, wherein all of the selected respective symbol rates are different from each other; and generating (220*a*) each of the two or more signals by application of the selected respective symbol rate to the address field and the message.

7. The method of item 6, wherein staggering the address fields in time comprises starting with the address field (1225*b*) of the signal generated by application of the lowest symbol rate among the selected respective symbol rates.

8. The method of item 7 wherein staggering the address fields in time comprises staggering the address fields in time in an order corresponding to an increasing order of the selected respective symbol rates.

9. The method of any of items 6 through 8, wherein selecting the respective symbol rates comprises letting any pair of the selected respective symbol rates differ by a factor of two to the power of n, where n is an integer.

10. The method of any of items 6 through 9, wherein the respective symbol rates are respective Manchester coding symbol rates.

11. The method of item 10, wherein all Manchester codes having the selected respective Manchester coding symbol rates are orthogonal to each other.

12. A method of a wireless receiver, for processing of a received packet (1225*b*) comprising two or more multiplexed signals concurrently transmitted, wherein each signal comprises a message (1230*b*, 1230*c*, 1230*d*) and a prepended address field (1225*b*, 1225*c*, 1225*d*) indicative of an intended receiver of the message, wherein the two or more signals at least partly overlap each other in time, and wherein the address fields are staggered in time, the method comprising:

determining (640*a*), for a first address field (1225*b*) of the address fields, whether the intended receiver of the first address field is the wireless receiver; and when the intended receiver of the first address field is the wireless receiver, demodulating (630*a*) a first signal of the two or more signals comprising the first address field.

13. The method of item 12, further comprising:

when the intended receiver of the first address field is not the wireless receiver, determining (640*a*), for a second address field (1225*c*, 1225*d*) of the address fields, whether the intended receiver of the second address field is the wireless receiver; and when the intended receiver of the second address field is the wireless receiver, demodulating (630*a*) a second signal of the two or more signals comprising the second address field.

14. The method of item 13, wherein respective symbol rates of the two or more signals are different from each other, and wherein the address fields are staggered in time starting with the address field of the signal having lowest symbol rate among the respective symbol rates, the method further comprising:

identifying (621*a*) a symbol rate of the second signal as a symbol rate which is higher than a symbol rate of the first signal; and using the identified symbol rate of the second signal for determining whether the intended receiver of the second address field is the wireless receiver.

15. The method of item 14, wherein the received packet further comprises a common synchronization part (1210*b*) prepended to the multiplexed two or more signals, the method further comprising:

identifying (620*a*) the symbol rate of the first signal from the common synchronization part; and using the identified symbol rate of the first signal for determining whether the intended receiver of the first address field is the wireless receiver.

16. The method of any of items 12 through 15, wherein the two or more signals are two or more wake-up signals, WUS, and wherein the wireless receiver is a wake-up radio, WUR.

17. A computer program product comprising a non-transitory computer readable medium (1300), having thereon a computer program comprising program instructions, the computer program being loadable into a data processing unit and configured to cause execution of the method according to any of items 1 through 16 when the computer program is run by the data processing unit.

18. An apparatus for a wireless transmitter, for preparing a packet (1200*b*) for concurrent transmission of two or more signals, wherein each signal comprises a message (1230*b*, 1230*c*, 1230*d*) and a prepended address field (1225*b*, 1225*c*, 1225*d*) indicative of an intended receiver of the message, the apparatus comprising a controller (700) configured to cause:

multiplexing of the two or more signals for transmission in the packet by causing organizing of the two or more signals in time to at least partly overlap each other, wherein organizing of the two or more signals comprises staggering of the address fields in time.

19. The apparatus of item 18, wherein the controller is further adapted to cause prepending of a common synchronization part (1210*b*) to the multiplexed two or more signals.

20. The apparatus of any of items 18 through 19, wherein the controller is further adapted to cause transmission of the packet addressing the intended receivers.

21. The apparatus of any of items 18 through 20, wherein the controller is further adapted to cause generation of each of the two or more signals by application of on-off keying, OOK, or binary frequency shift keying, BFSK.

22. The apparatus of any of items 18 through 21, wherein the two or more signals are two or more wake-up signals, WUS.

23. The apparatus of any of items 18 through 22, wherein the controller is further adapted to cause:

selection of a respective symbol rate for generation of each of the two or more signals, wherein all of the selected respective symbol rates are different from each other; and generation of each of the two or more signals by application of the selected respective symbol rate to the address field and the message.

24. The apparatus of item 23, wherein staggering the address fields in time comprises starting with the address field (1225*b*) of the signal generated by application of the lowest symbol rate among the selected respective symbol rates.

25. The apparatus of item 24 wherein staggering the address fields in time comprises staggering the address fields in time in an order corresponding to an increasing order of the selected respective symbol rates.

26. The apparatus of any of items 23 through 25, wherein the controller is adapted to cause the selection of the respective symbol rates by causing any pair of the selected respective symbol rates to differ by a factor of two to the power of n, where n is an integer.

27. The apparatus of any of items 23 through 26, wherein the respective symbol rates are respective Manchester coding symbol rates.

28. The apparatus of item 27, wherein all Manchester codes having the selected respective Manchester coding symbol rates are orthogonal to each other.

29. A wireless transmitter node comprising the apparatus of any of items 18 through 28.

30. An apparatus for a wireless receiver, for processing of a received packet (1225*b*) comprising two or more multiplexed signals concurrently transmitted, wherein each signal comprises a message (1230*b*, 1230*c*, 1230*d*) and a prepended address field (1225*b*, 1225*c*, 1225*d*) indicative of an intended receiver of the message, wherein the two or more signals at least partly overlap each other in time, and wherein the address fields are staggered in time, the apparatus comprising a controller (900*b*) configured to cause:
determination, for a first address field (1225*b*) of the address fields, of whether the intended receiver of the first address field is the wireless receiver; and
responsive to the intended receiver of the first address field being the wireless receiver, demodulation of a first signal of the two or more signals comprising the first address field.

31. The apparatus of item 30, wherein the controller is further adapted to cause:
responsive to the intended receiver of the first address field not being the wireless receiver, determination, for a second address field (1225*c*, 1225*d*) of the address fields, of whether the intended receiver of the second address field is the wireless receiver; and
responsive to the intended receiver of the second address field being the wireless receiver, demodulation of a second signal of the two or more signals comprising the second address field.

32. The apparatus of item 31, wherein respective symbol rates of the two or more signals are different from each other, and wherein the address fields are staggered in time starting with the address field of the signal having lowest symbol rate among the respective symbol rates, the controller being further adapted to cause:
identification of a symbol rate of the second signal as a symbol rate which is higher than a symbol rate of the first signal; and
using of the identified symbol rate of the second signal for the determination of whether the intended receiver of the second address field is the wireless receiver.

33. The apparatus of item 32, wherein the received packet further comprises a common synchronization part (1210*b*) prepended to the multiplexed two or more signals, the controller being further adapted to cause:
identification of the symbol rate of the first signal from the common synchronization part; and
using of the identified symbol rate of the first signal for the determination of whether the intended receiver of the first address field is the wireless receiver.

34. The apparatus of any of items 30 through 33, wherein the two or more signals are two or more wake-up signals, WUS, and wherein the wireless receiver is a wake-up radio, WUR.

35. A wireless receiver comprising the apparatus of any of items 30 through 33.

The invention claimed is:

1. A method of a network node for concurrently transmitting two or more wake-up signals (WUS) using a signal generator applying a signal generator symbol rate, wherein each WUS is for reception by a wake-up receiver (WUR) of a respective wireless communication device, the method comprising:
selecting a respective Manchester coding symbol rate for each of the two or more WUS, wherein all of the selected respective Manchester coding symbol rates are different from each other, and wherein all Manchester codes having the selected respective Manchester coding symbol rates are orthogonal to each other;
generating each of the two or more WUS using the signal generator and application of a Manchester code of the selected respective Manchester coding symbol rate; and
multiplexing the two or more WUS for transmission in a WUS message.

2. The method of claim 1, wherein the selecting the respective Manchester coding symbol rates comprises letting any pair of the selected respective Manchester coding symbol rates differ by a factor of two to the power of n, where n is an integer.

3. The method of claim 1, wherein the selecting the respective Manchester coding symbol rates comprises letting all of the selected respective Manchester coding symbol rates be related to the signal generator symbol rate by a factor of two to the power of k, where k is an integer.

4. The method of claim 1, wherein the generating each of the two or more WUS comprises time aligning the two or more WUS with each other such that each of the two or more WUS has a Manchester coding symbol boundary whenever any WUS of a lower respective Manchester coding symbol rate has a Manchester coding symbol boundary.

5. The method of claim 1, wherein the generating each of the two or more WUS comprises, when the selected respective Manchester coding symbol rate is lower than the signal generator symbol rate:
applying the Manchester code to symbols of the WUS; and
inputting the result to the signal generator.

6. The method of claim 5, wherein the generating each of the two or more WUS further comprises, when the selected respective Manchester coding symbol rate is equal to the signal generator symbol rate divided by two to the power of m, where m is a positive integer, repeating each of the Manchester coded symbols to produce two to the power of m identical Manchester coded symbols before inputting the result to the signal generator.

7. The method of claim 1, wherein the generating each of the two or more WUS comprises applying the Manchester code in an on-off keying manner to an output from the signal generator based on symbols of the WUS.

8. The method of claim 1, wherein the selecting the respective Manchester coding symbol rate for each of the two or more WUS comprises:
selecting a first Manchester coding symbol rate for a first WUS; and
selecting a second Manchester coding symbol rate for a second WUS;
wherein the first Manchester coding symbol rate is lower than the second Manchester coding symbol rate when channel conditions associated with the respective wireless communication device of the first WUS require more robust transmission than channel conditions associated with the respective wireless communication device of the second WUS.

9. The method of claim 1, wherein the generating each of the two or more WUS comprises applying a respective forward error correction code to at least one of the two or more WUS before application of the Manchester code.

10. The method of claim 9, further comprising selecting a coding rate of the respective forward error correcting code such that the selected coding rate of the respective forward error correcting code multiplied by the selected respective Manchester coding symbol rate enables use of a desirable WUS data rate.

11. The method of claim 1, further comprising:
generating a WUS packet for transmission;
wherein the WUS packet comprises a first part for time synchronization by all of the respective wireless communication devices, and a second part comprising the multiplexed two or more WUS.

12. The method of claim 1:
further comprising preparing a packet for concurrent transmission of the two or more WUS;
wherein each WUS comprises a message and a prepended address field indicative of an intended receiver of the message, wherein the WUS message comprises the packet;
wherein the preparing comprises organizing, as part of the multiplexing, the two or more WUS in time to at least partly overlap each other;
wherein the organizing the two or more WUS comprises staggering the address fields in time.

13. The method of claim 12, further comprising prepending a common synchronization part to the multiplexed two or more WUS.

14. The method of claim 12, wherein the selected respective Manchester coding symbol rate is applied to the address field and the message.

15. The method of claim 14, wherein the staggering the address fields in time comprises starting with the address field of the WUS generated by application of the lowest Manchester coding symbol rate among the selected respective Manchester coding symbol rates.

16. The method of claim 15, wherein the staggering the address fields in time comprises staggering the address fields in time in an order corresponding to an increasing order of the selected respective Manchester coding symbol rates.

17. A method of a network node for concurrently transmitting two or more wake-up signals (WUS) using a signal generator applying a signal generator symbol rate, wherein each WUS is for reception by a wake-up receiver (WUR) of a respective wireless communication device, the method comprising:
selecting a respective Manchester coding symbol rate for at least one of the two or more WUS, wherein all of the selected respective Manchester coding symbol rates are different from each other, and wherein all Manchester codes having the selected respective Manchester coding symbol rates are orthogonal to each other;
generating one or more WUS using the signal generator and application of a Manchester code of the selected respective Manchester coding symbol rate;
generating a non-Manchester coded WUS using on-off keying and the signal generator; and
multiplexing the at least one Manchester-coded WUS with the non-Manchester coded WUS for transmission in a WUS message.

18. A method of operating a wake-up receiver (WUR), configured to be comprised in a wireless communication device also comprising a main receiver; the wireless communication device configured to receive, from a network node, a wake-up signal (WUS) message comprising two or more multiplexed WUS, a particular WUS of the multiplexed MUS being for waking up the main receiver of the wireless communication device; wherein each of the two or more WUS is encoded by a Manchester code of a selected respective Manchester coding symbol rate, wherein all of the selected respective Manchester coding symbol rates are different from each other, and wherein all Manchester codes having the selected respective Manchester coding symbol rates are orthogonal to each other; the method comprising:
receiving the WUS message;
determining which of the selected respective Manchester coding symbol rates to apply;
demodulating the WUS message using the determined Manchester coding symbol rate;
determining whether the particular WUS is detected; and
waking up the main receiver responsive to detection of the particular WUS.

19. The method of claim 18:
wherein the particular WUS is encoded by a respective forward error correction code before application of the Manchester code;
the method further comprising:
determining one or more parameters of the respective forward error correction code; and
forward error correction decoding the WUS message based on the determined parameters after demodulating the WUS message.

20. The method of claim 18:
wherein the WUS message is comprised in a WUS packet;
wherein the WUS packet comprises a first part for time synchronization by the wireless communication device, and a second part comprising the WUS message.

21. The method of claim 18:
further comprising processing of a received packet comprising the two or more multiplexed WUS concurrently transmitted, wherein each WUS comprises a message and a prepended address field indicative of an intended receiver of the message, wherein the two or more WUS at least partly overlap each other in time, wherein the address fields are staggered in time, wherein the WUS message comprises the packet;
wherein the determining which of the selected respective Manchester coding symbol rates to apply comprises determining, for a first address field of the address fields, whether the intended receiver of the first address field is the WUR; and
wherein the demodulating the WUS message comprises, when the intended receiver of the first address field is the WUR, demodulating a first WUS of the two or more WUS comprising the first address field.

22. The method of claim 21, wherein:
the determining which of the selected respective Manchester coding symbol rates to apply comprises, when the intended receiver of the first address field is not the WUR, determining, for a second address field of the address fields, whether the intended receiver of the second address field is the WUR; and
the demodulating the WUS message comprises, when the intended receiver of the second address field is the WUR, demodulating a second WUS of the two or more WUS comprising the second address field.

23. The method of claim 22:
wherein the address fields are staggered in time starting with the address field of the WUS having lowest Manchester coding symbol rate among the respective Manchester coding symbol rates;
wherein the method further comprises:

identifying a Manchester coding symbol rate of the second WUS as a Manchester coding symbol rate which is higher than a Manchester coding symbol rate of the first WUS; and using the identified Manchester coding symbol rate of the second WUS for determining whether the intended receiver of the second address field is the WUR.

24. The method of claim 23:

wherein the received packet further comprises a common synchronization part prepended to the multiplexed two or more WUS;

wherein the method further comprises:
identifying the Manchester coding symbol rate of the first WUS from the common synchronization part; and using the identified Manchester coding symbol rate of the first WUS for determining whether the intended receiver of the first address field is the WUR.

25. An arrangement for a network node, for concurrent transmission of two or more wake-up signals (WUS) using a signal generator configured to apply a signal generator symbol rate, wherein each WUS is for reception by a wake-up receiver (WUR) of a respective wireless communication device, the arrangement comprising:

processing circuitry configured to cause:
selection of a respective Manchester coding symbol rate for each of the two or more WUS, wherein all of the selected respective Manchester coding symbol rates are different from each other, and wherein all Manchester codes having the selected respective Manchester coding symbol rates are orthogonal to each other;

generation of each of the two or more WUS using the signal generator and application of a Manchester code of the selected respective Manchester coding symbol rate; and multiplexing of the two or more WUS for transmission in a WUS message.

26. An arrangement for a network node, for concurrent transmission of two or more wake-up signals (WUS) using a signal generator configured to apply a signal generator symbol rate, wherein each WUS is for reception by a wake-up receiver (WUR) of a respective wireless communication device, the arrangement comprising:

processing circuitry configured to cause:
selection of a respective Manchester coding symbol rate for at least one of the two or more WUS, wherein all of the selected respective Manchester coding symbol rates are different from each other, and wherein all Manchester codes having the selected respective Manchester coding symbol rates are orthogonal to each other;

generation of one or more WUS using the signal generator and application of a Manchester code of the selected respective Manchester coding symbol rate;

generation of a non-Manchester coded WUS using on-off keying and the signal generator; and multiplexing of the at least one Manchester-coded WUS with the non-Manchester coded WUS for transmission in a WUS message.

27. An arrangement for a wake-up receiver (WUR) configured to be comprised in a wireless communication device also comprising a main receiver; the wireless communication device configured to receive, from the network node, a wake-up signal (WUS) message comprising two or more multiplexed WUS, a particular WUS of the multiplexed WUS being for waking up the main receiver of the wireless communication device; wherein each of the two or more WUS is encoded by a Manchester code of a selected respective Manchester coding symbol rate, wherein all of the selected respective Manchester coding symbol rates are different from each other, and wherein all Manchester codes having the selected respective Manchester coding symbol rates are orthogonal to each other, the arrangement comprising:

processing circuitry configured to cause:
reception of the WUS message;
determination of which of the selected respective Manchester coding symbol rates to apply;
demodulation of the WUS message using the determined Manchester coding symbol rate;
determination of whether the particular WUS is detected; and
waking up of the main receiver responsive to detection of the particular WUS.

\* \* \* \* \*

UNITED STATES PATENT AND TRADEMARK OFFICE
CERTIFICATE OF CORRECTION

Page 1 of 1

PATENT NO. : 11,051,249 B2
APPLICATION NO. : 16/641795
DATED : June 29, 2021
INVENTOR(S) : Wilhelmsson et al.

It is certified that error appears in the above-identified patent and that said Letters Patent is hereby corrected as shown below:

In the Specification

In Column 1, Line 24, delete "media access control (MAC)" and insert -- medium access control (MAC) --, therefor.

In Column 10, Lines 15-16, delete "to for both the singular from" and insert -- for both the singular form --, therefor.

In Column 24, Line 10, delete "filed" and insert -- field --, therefor.

In the Claims

In Column 38, Line 1, in Claim 18, delete "MUS" and insert -- WUS --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*